(12) United States Patent
Wang et al.

(10) Patent No.: US 12,317,320 B2
(45) Date of Patent: May 27, 2025

(54) COT INDICATION INFORMATION SENDING METHOD AND APPARATUS

(71) Applicant: Huawei Technologies Co., Ltd., Shenzhen (CN)

(72) Inventors: Junwei Wang, Shenzhen (CN); Fan Yang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 729 days.

(21) Appl. No.: 17/496,062

(22) Filed: Oct. 7, 2021

(65) Prior Publication Data

US 2022/0030630 A1  Jan. 27, 2022

Related U.S. Application Data

(63) Continuation of application No. PCT/CN2020/080331, filed on Mar. 20, 2020.

(30) Foreign Application Priority Data

Apr. 8, 2019  (CN) .......................... 201910277997.8

(51) Int. Cl.
*H04W 74/0816* (2024.01)
*H04L 1/00* (2006.01)
(Continued)

(52) U.S. Cl.
CPC ....... *H04W 74/0816* (2013.01); *H04L 1/0038* (2013.01); *H04W 72/0446* (2013.01); *H04W 74/006* (2013.01); *H04W 74/0866* (2013.01)

(58) Field of Classification Search
CPC ......... H04W 74/0816; H04W 72/0446; H04W 74/006; H04W 74/0866; H04W 72/23;
(Continued)

(56) References Cited

U.S. PATENT DOCUMENTS

| 2018/0213411 A1 | 7/2018 | Wang et al. |
| 2021/0351890 A1* | 11/2021 | Tang ..................... H04W 16/14 |
| 2022/0132342 A1* | 4/2022 | Kim .................. H04W 74/0816 |

FOREIGN PATENT DOCUMENTS

| CN | 106658739 A | 5/2017 |
| CN | 106922032 A | 7/2017 |

(Continued)

OTHER PUBLICATIONS

Interdigital Inc., "On NR-Unlicensed Frame Structure", 3GPP TSG RAN WG1 Meeting #93, R1-1807034, Busan, Korea, May 21-25, 2018, 5 pages.

(Continued)

*Primary Examiner* — Oscar A Louie
*Assistant Examiner* — Ranjan Pant
(74) *Attorney, Agent, or Firm* — Slater Matsil, LLP

(57) ABSTRACT

When a channel is not occupied within a first COT, a network device sends indication information to a terminal device within the first COT, where the indication information is used to indicate that the channel is not occupied within the first COT. When the channel is occupied within the first COT, the network device obtains a second COT within the first COT, and sends start information of the second COT to the terminal device. Correspondingly, when receiving the indication information, the terminal device may perform blind PDCCH detection in a first manner. If the terminal device does not receive the indication information, it indicates that the channel is occupied within the first COT, and the terminal device performs blind detection on the start information of the second COT.

20 Claims, 17 Drawing Sheets

(51) Int. Cl.
*H04W 72/0446* (2023.01)
*H04W 74/00* (2009.01)
*H04W 74/08* (2024.01)

(58) Field of Classification Search
CPC ... H04L 1/0038; H04L 1/0072; H04L 1/0046; H04L 5/0094; H04L 5/0053; Y02D 30/70
See application file for complete search history.

(56) References Cited

FOREIGN PATENT DOCUMENTS

| | | | |
|---|---|---|---|
| CN | 107889114 A | 4/2018 | |
| CN | 107925528 A | 4/2018 | |
| CN | 107926048 A | 4/2018 | |
| CN | 109076558 A | 12/2018 | |
| CN | 109152054 A | 1/2019 | |
| CN | 109155720 A | 1/2019 | |
| WO | 2018059179 A1 | 4/2018 | |
| WO | 2018160219 A1 | 9/2018 | |
| WO | WO-2020042170 A1 * | 3/2020 | ............. H04B 17/30 |
| WO | WO-2020168072 A1 * | 8/2020 | ......... H04L 27/0006 |

OTHER PUBLICATIONS

Intel Corporation, "DL Signals and Channels for NR-unlicensed", 3GPP TSG RAN WG1 Meeting #96bis, R1-1904283, Xi'an, China, Apr. 8-12, 2019, 5 pages.

Zte, "Considerations on DL reference signals and channels design for NR-U", 3GPP TSG RAN WG1 Meeting #95, R1-1812433, Spokane, WA, US, Nov. 12-16, 2018, 8 pages.

IEEE P802.11ax™/D2.2, Draft Standard for Information technology-Telecommunications and information exchange between systems Local and metropolitan area networks-Specific requirements; Part 11: Wireless LAN Medium Access Control (MAC) and Physical Layer (PHY) Specifications; Amendment 6: Enhancements for High Efficiency WLAN, Feb. 2018, 620 pages.

Nokia et al., "On DL Signals and Channels for NR-U", 3GPP TSG RAN WG1 Meeting #95, R1-1812696, Spokane, WA, US, Nov. 12-16, 2018, 17 pages.

IEEE Std 802.11a-1999 (Supplement to IEEE Std 802.Nov. 1999, Supplement to IEEE Standard for Information technology—Telecommunications and information exchange between systems—Local and metropolitan area networks Specific requirements; Part 11: Wireless LAN Medium Access Control (MAC) and Physical Layer (PHY) specifications: High-speed Physical Layer in the 5 GHZ Band, LAN/MAN Standards Committee of the IEEE Computer Society, Sep. 16, 1999, 90 pages.

* cited by examiner

Network device                Terminal device

| Slot | 0 | 1 | 2 | 3 | 4 | 5 | 6 | 7 | 8 | 9 |
|---|---|---|---|---|---|---|---|---|---|---|
| Indication information | 0 | 0 | 1 | 0 | 0 | 0 | 1 | 1 | 0 | 0 |

COT INDICATION INFORMATION SENDING METHOD AND APPARATUS

CROSS-REFERENCE TO RELATED APPLICATIONS

This application is a continuation of International Application No. PCT/CN2020/080331, filed on Mar. 20, 2020, which claims priority to Chinese Patent Application No. 201910277997.8, filed on Apr. 8, 2019. The disclosures of the aforementioned applications are hereby incorporated by reference in their entireties.

TECHNICAL FIELD

This application relates to the field of communications technologies, and in particular, to a channel occupancy time (COT) indication information sending method and apparatus.

BACKGROUND

Using an unlicensed spectrum can provide an end user with a higher service rate and better user experience. The unlicensed spectrum is sharable. To be specific, a network device can use the spectrum to receive and send information provided that the network device complies with a specific regulation. To make network devices coexist relatively well, all network devices need to listen to a to-be-occupied channel before sending information. Information can be sent only when the channel is in an idle state, and if the channel is not in the idle state, listening continues. In other words, a listen before talk (LBT) mechanism is used.

The network device obtains a sending opportunity through the LBT, and a time length of the sending opportunity during which information can be continuously sent is referred to as a COT. After obtaining the COT, the network device can share the spectrum with a terminal device, and send frame format information corresponding to the COT to the terminal device. After receiving scheduling information from the network device, the terminal device uses the LBT mechanism to perform transmission in combination with the frame format information. In a conventional technology, to improve utilization of a spectrum and reduce power consumption of a terminal device, different blind detection manners are configured in different time periods of a COT. For example, in a slot (the first slot) in which a start location of the COT is located, a network device configures a physical downlink control channel (PDCCH) blind detection manner with relatively high density, and configures a blind PDCCH detection manner with relatively sparse density in a subsequent slot.

However, in the solution of the conventional technology, when a channel is occupied within the COT, the terminal device cannot use a suitable blind detection manner in time.

SUMMARY

This application provides a COT indication information sending method and apparatus, so that a terminal device can learn of a channel occupancy condition within a COT in time, to perform blind detection in a suitable blind detection manner, thereby improving utilization of spectrum resources and reducing power consumption of the terminal device.

According to a first aspect, this application provides a COT indication information sending method. When a channel is not occupied within a first channel occupancy time (COT), a network device sends indication information to a terminal device within the first COT, where the indication information is used to indicate that the channel is not occupied within the first COT. When the channel is occupied within the first COT, the network device obtains a second COT within the first COT, and sends start information of the second COT to the terminal device. Correspondingly, when receiving the indication information, the terminal device may perform blind PDCCH detection in a first manner. If the terminal device does not receive the indication information, it indicates that the channel is occupied within the first COT, and the terminal device performs blind detection on the start information of the second COT. Therefore, the terminal device can learn of a channel occupancy condition within a COT in time, to perform blind detection in a suitable blind detection manner, thereby improving utilization of spectrum resources and reducing power consumption of the terminal device.

In a possible design, because a gap easily appears at locations at which uplink symbols and downlink symbols are switched, a COT is likely to be occupied by another device. Therefore, an implementation in which the network device sends the indication information to the terminal device within the first COT is as follows: The indication information is sent within first N downlink symbols after uplink symbols and downlink symbols within the first COT are switched, where N is a positive integer.

In a possible design, an implementation in which the network device sends the indication information to the terminal device within the first COT is as follows. The network device periodically sends the indication information on downlink symbols within the first COT, where a period length of the indication information is M symbols, and M is a positive integer. Therefore, the terminal device can periodically receive the indication information.

In a possible design, the indication information includes any one of the following:

a demodulation reference signal (DMRS);

a DMRS and control information of a control channel carrying the DMRS; or a preamble sequence.

In a possible design, when the channel is occupied within the first COT, that the network device obtains a second COT within the first COT includes:

When the channel is occupied within the first COT, the network device obtains the second COT within the first COT by using a listen before talk category LBT Cat 4.

According to a second aspect, this application provides a COT indication information sending method. A terminal device receives indication information used to indicate that a channel is not occupied within a first channel occupancy time COT. When the terminal device does not receive the indication information, it is considered that the channel is occupied within the first COT, and the terminal device receives start information of a second COT that is sent by a network device.

In a possible design, that a terminal device receives indication information includes:

The terminal device receives the indication information within first N downlink symbols after uplink symbols and downlink symbols within the first COT are switched, where N is a positive integer.

In a possible design, that a terminal device receives indication information includes:

The terminal device periodically receives the indication information on downlink symbols within the first COT, where a period length of the indication information is M symbols, and M is a positive integer.

In a possible design, the indication information includes any one of the following:

a demodulation reference signal (DMRS);

a DMRS and control information of a control channel carrying the DMRS; or a preamble sequence.

In a possible design, the method further includes the following.

When the terminal device receives the indication information, the terminal device performs blind physical downlink control channel PDCCH detection in a first manner; and when the terminal device does not receive the indication information, the terminal device performs blind PDCCH detection in a second manner, where within a unit time, location points at which the terminal device performs blind PDCCH detection in the second manner are more than location points at which the terminal device performs blind PDCCH detection in the first manner.

According to a third aspect, this application provides a COT indication information sending method, including the following.

A network device determines that a channel is occupied within a first channel occupancy time (COT); and obtains a second COT within the first COT, and sends indication information to a terminal device, where the indication information is used to indicate transmission of the terminal device.

In a possible design, that a network device sends indication information to a terminal device includes:

The network device sends the indication information to the terminal device based on an end time of the second COT and an end time of the first COT.

In a possible design, when the end time of the second COT is earlier than or equal to the end time of the first COT, the indication information indicates the terminal device to end transmission at the end time of the second COT; or when the end time of the second COT is later than the end time of the first COT, the indication information indicates the terminal device to continue transmission after the end time of the first COT.

In a possible design, the indication information further includes at least one of the following:

update information of the first COT;

update information of the second COT;

a remaining time length of the second COT;

frame format information corresponding to the remaining time length of the second COT; and frame format information of the second COT.

In a possible design, that a network device sends indication information to a terminal device includes the following.

The network device periodically sends the indication information to the terminal device.

In a possible design, the method further includes:

The network device determines a quantity of symbols of an end slot of the first COT based on start information of the first COT; or the network device determines a quantity of valid symbols of an end slot of the second COT based on start information of the second COT.

According to a fourth aspect, this application provides a COT indication information sending method, including the following.

A terminal device receives indication information sent by a network device, where the indication information is used to indicate transmission of the terminal device.

In a possible design, when an end time of the second COT is earlier than or equal to an end time of the first COT, the indication information indicates the terminal device to end transmission at the end time of the second COT; or when the end time of the second COT is later than the end time of the first COT, the indication information indicates the terminal device to continue transmission after the end time of the first COT.

In a possible design, the indication information further includes at least one of the following:

update information of the first COT;

update information of the second COT;

a remaining time length of the second COT;

frame format information corresponding to the remaining time length of the second COT; and frame format information of the second COT.

In a possible design, that a terminal device receives indication information sent by a network device includes the following.

The terminal device periodically receives the indication information sent by the network device.

In a possible design, the method further includes the following.

The terminal device determines a quantity of valid symbols of an end slot of the second COT based on start information of the second COT.

In a possible design, that the terminal device determines a quantity of valid symbols of an end slot of the second COT based on start information of the second COT includes the following.

The terminal device determines a quantity of valid symbols of a start slot of the second COT based on the start information of the second COT, and determines the quantity of valid symbols of the end slot based on the quantity of valid symbols of the start slot and a quantity of symbols of a complete slot, where a sum of the quantity of valid symbols of the start slot and the quantity of valid symbols of the end slot is equal to the quantity of symbols of the complete slot.

According to a fifth aspect, this application provides a communications apparatus, including: a sending module, configured to: when a channel is not occupied within a first channel occupancy time (COT), send indication information to a terminal device within the first COT, where the indication information is used to indicate that the channel is not occupied within the first COT; and a processing module, configured to: when the channel is occupied within the first COT, obtain, by the network device, a second COT within the first COT, where the sending module is further configured to send start information of the second COT to the terminal device.

In a possible design, the sending module is specifically configured to send the indication information within first N downlink symbols after uplink symbols and downlink symbols within the first COT are switched, where N is a positive integer.

In a possible design, the sending module is specifically configured to periodically send the indication information on downlink symbols within the first COT, where a period length of the indication information is M symbols, and M is a positive integer.

In a possible design, the indication information includes any one of the following:

a demodulation reference signal DMRS;

a DMRS and control information of a control channel carrying the DMRS; or a preamble sequence.

According to a sixth aspect, this application provides a communications apparatus, including: a receiving module, configured to receive indication information, where the indication information is used to indicate that a channel is not occupied within a first channel occupancy time (COT); and a processing module, configured to: when the receiving module does not receive the indication information, enable the receiving module to receive start information of a second COT that is sent by a network device.

In a possible design, the receiving module is specifically configured to receive the indication information within first N downlink symbols after uplink symbols and downlink symbols within the first COT are switched, where N is a positive integer.

In a possible design, the receiving module is specifically configured to periodically receive the indication information on downlink symbols within the first COT, where a period length of the indication information is M symbols, and M is a positive integer.

In a possible design, the indication information includes any one of the following:
 a demodulation reference signal DMRS;
 a DMRS and control information of a control channel carrying the DMRS; or
 a preamble sequence.

In a possible design, the receiving module is further configured to perform blind physical downlink control channel (PDCCH) detection in a first manner when receiving the indication information; and the processing module is further configured to: when the receiving module does not receive the indication information, enable the receiving module to perform blind PDCCH detection in a second manner, where within a unit time, location points at which the receiving module performs blind PDCCH detection in the second manner are more than location points at which the receiving module performs blind PDCCH detection in the first manner.

According to a seventh aspect, this application provides a communications apparatus, including: a processing module, configured to determine that a channel is occupied within a first channel occupancy time (COT), where the processing module is further configured to obtain a second COT within the first COT; and a sending module, configured to send indication information to a terminal device, where the indication information is used to indicate transmission of the terminal device.

In a possible design, the processing module is specifically configured to enable the sending module to send the indication information to the terminal device based on an end time of the second COT and an end time of the first COT.

In a possible design, when the end time of the second COT is earlier than or equal to the end time of the first COT, the indication information indicates the terminal device to end transmission at the end time of the second COT; or when the end time of the second COT is later than the end time of the first COT, the indication information indicates the terminal device to continue transmission after the end time of the first COT.

In a possible design, the indication information further includes at least one of the following:
 update information of the first COT;
 update information of the second COT;
 a remaining time length of the second COT;
 frame format information corresponding to the remaining time length of the second COT; and
 frame format information of the second COT.

In a possible design, the sending module is specifically configured to periodically send the indication information to the terminal device.

In a possible design, the processing module is further configured to: determine a quantity of symbols of an end slot of the first COT based on start information of the first COT; or determine a quantity of valid symbols of an end slot of the second COT based on start information of the second COT.

According to an eighth aspect, this application provides a communications apparatus, including: a receiving module, configured to receive indication information sent by a network device, where the indication information is used to indicate transmission of a terminal device.

In a possible design, when an end time of the second COT is earlier than or equal to an end time of the first COT, the indication information indicates the terminal device to end transmission at the end time of the second COT; or when the end time of the second COT is later than the end time of the first COT, the indication information indicates the terminal device to continue transmission after the end time of the first COT.

In a possible design, the indication information further includes at least one of the following:
 update information of the first COT;
 update information of the second COT;
 a remaining time length of the second COT;
 frame format information corresponding to the remaining time length of the second COT; and
 frame format information of the second COT.

In a possible design, the receiving module is specifically configured to periodically receive the indication information sent by the network device.

In a possible design, the apparatus further includes: a processing module, configured to determine a quantity of valid symbols of an end slot of the second COT based on start information of the second COT.

In a possible design, the processing module is specifically configured to: determine a quantity of valid symbols of a start slot of the second COT based on the start information of the second COT, and determine the quantity of valid symbols of the end slot based on the quantity of valid symbols of the start slot and a quantity of symbols of a complete slot, where a sum of the quantity of valid symbols of the start slot and the quantity of valid symbols of the end slot is equal to the quantity of symbols of the complete slot.

According to a ninth aspect, this application provides a communications apparatus. The communications apparatus may be a chip or a system-on-a-chip in a network device, and includes a processor and an interface circuit. The interface circuit is configured to receive and transmit code instructions to the processor. The processor is configured to run the code instructions, to perform the COT indication information sending method described in the first aspect or any possible design of the first aspect or in the third aspect or any possible design of the third aspect.

According to a tenth aspect, this application provides a communications apparatus. The communications apparatus may be a chip or a system-on-a-chip in a terminal device, and includes a processor and an interface circuit. The interface circuit is configured to receive and transmit code instructions to the processor. The processor is configured to run the code instructions, to perform the COT indication information sending method described in the second aspect or any possible design of the second aspect or in the fourth aspect or any possible design of the fourth aspect.

According to an eleventh aspect, this application provides a communications apparatus, including a memory and a processor. The processor executes program instructions in the memory, to implement the COT indication information sending method described in the first aspect or any possible design of the first aspect or in the third aspect or any possible design of the third aspect.

According to a twelfth aspect, this application provides a communications apparatus, including a memory and a processor. The processor executes program instructions in the memory, to implement the COT indication information sending method described in the second aspect or any possible design of the second aspect or in the fourth aspect or any possible design of the fourth aspect.

According to a thirteenth aspect, this application provides a storage medium. The storage medium is configured to store a computer program, and the computer program is used to implement the COT indication information sending method described in the first aspect or any possible design of the first aspect or in the third aspect or any possible design of the third aspect.

According to a fourteenth aspect, this application provides a storage medium. The storage medium is configured to store a computer program, and the computer program is used to implement the COT indication information sending method described in the second aspect or any possible design of the second aspect or in the fourth aspect or any possible design of the fourth aspect.

According to a fifteenth aspect, this application provides a communications system, including the communications apparatus described in the fifth aspect and corresponding feasible implementations and the communications apparatus described in the sixth aspect and corresponding feasible implementations.

According to a sixteenth aspect, this application provides a communications system, including the communications apparatus described in the seventh aspect and corresponding feasible implementations and the communications apparatus described in the eighth aspect and corresponding feasible implementations.

It should be understood that, the technical solutions of the second aspect to the sixteenth aspect of this application correspond to the technical solutions of the first aspect of this application, and beneficial effects obtained by each aspect and corresponding feasible implementations are similar and are not described in detail again.

DETAILED DESCRIPTION OF ILLUSTRATIVE EMBODIMENTS

A network architecture and a service scenario described in embodiments of this application are intended to describe technical solutions in the embodiments of this application more clearly, and do not constitute a limitation on the technical solutions provided in the embodiments of this application. A person of ordinary skill in the art may know that with evolution of the network architecture and emergence of new service scenarios, the technical solutions provided in the embodiments of this application are also applicable to similar technical problems.

The technical solutions in this application may be applied to a communications system, for example, a 5th generation (5G) communications system, a long term evolution (LTE) communications system, a universal mobile telecommunications system (UMTS) terrestrial radio access network (UTRAN) system, or a global system for mobile communications (GSM)/enhanced data rate for GSM evolution (EDGE) system radio access network (GERAN) architecture. The technical solutions in this application may be further applied to other communications systems, for example, a public land mobile network (PLMN) system, a 6G system, and a subsequent communications system. This is not limited in this application.

Figure 1:
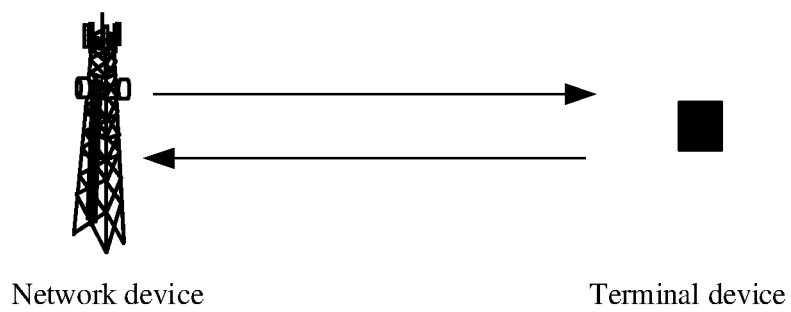
FIG. 1 is a schematic structural diagram of a communications system according to this application.

The communications system includes a network device and a terminal device, as shown in FIG. 1. FIG. 1 is a schematic structural diagram of a communications system according to this application.

The terminal device involved in this application may be a device that has a wireless transceiver function and that can provide a communication service for a user. Specifically, the terminal device may be a device in a vehicle-to-everything (V2X) system, a device in a device-to-device (D2D) system, a device in a machine type communication (MTC) system, or the like. For example, the terminal device may be referred to an industrial robot, an industrial automation device, user equipment (UE), an access terminal, a subscriber unit, a subscriber station, a mobile station, a mobile console, a remote station, a remote terminal, a mobile device, a user terminal, a terminal, a wireless terminal device, a user agent, a user apparatus. For example, the terminal device may be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a 5G network or a post-5G network, or a terminal device in a future evolved PLMN network. This is not limited in this application.

The network device involved in this application may be a device configured to communicate with the terminal device. For example, the network device may be a gNodeB (gNB) in a 5G new radio access technology (NR), or may be an evolved NodeB (eNB) in long term evolution (LTE), or may be a NodeB (NB) in a WCDMA system, or a base transceiver station (BTS) in a GSM system or a CDMA system. The network device may further be a relay node, an access point, a vehicle-mounted device, a wearable device, a network-side device in a network after 5G, a network device in a future evolved PLMN network, a road site unit (RSU), or the like. This is not limited in this application.

A relationship among a radio frame, a subframe, a time unit, a symbol, and a COT that may be involved in this application is as follows.

One radio frame may include a plurality of subframes, one subframe may include one or more complete time units, one complete time unit includes 14 symbols, and one COT may include a plurality of time units, where a start time unit and an end time unit may be complete time units or non-complete time units, a quantity of valid symbols in a non-complete time unit is less than 14, and a quantity of valid symbols in a time unit refers to a quantity of symbols in the time unit that are available within a COT.

One time unit may be one fixed time length, one slot, a plurality of slots, or the like. This is not limited in this application. In this application, an example in which one time unit is one slot is used for description in the following embodiments.

After obtaining a COT through LBT, the network device may occupy the COT to perform data or signal transmission, or may share the COT with the terminal device, so that the terminal device performs data or signal transmission. Specifically, the network device sends information about the COT (for example, start information of the COT, a time length of the COT, and frame format information of the COT) to the terminal device, so that the terminal device performs data or signal transmission based on the information about the COT.

The start information of the COT is used to indicate a start time location of the COT (for example, in a unit of a symbol). The terminal device determines that a symbol at which the start information of the COT is received is a start symbol of the COT. A COT starts from a start symbol. For example, if the terminal device receives the start information of the COT in the fifth symbol of a slot 1, the terminal device determines that the fifth symbol of the slot 1 is a start of the COT. Optionally, the start information of the COT may occupy one or more symbols. This is not limited in this application.

The time length of the COT is used to indicate a time of the COT during which the network device and the terminal device can perform data transmission, may indicate a start slot of the COT and an end slot of the COT, or may indicate a quantity of slots that the COT spans, or may indicate a quantity of symbols included in the COT, or may indicate a time length of the COT. For example, the time length of the COT may have a start slot of a slot 1 and an end slot of a slot 7; or may be seven slots; or may be 98 symbols; or may be 4.5 ms. This is not limited in this application.

The frame format information of the COT is used to indicate which slots are uplink slots, which slots are downlink slots, and which slots are mixed slots. All symbols of the uplink slots are used to transmit uplink data or uplink signals, all symbols of the downlink slots are used to transmit downlink data or downlink signals, some symbols of the mixed slots are used to transmit uplink data or uplink signals, and some symbols of the mixed slots are used to transmit downlink data or downlink signals.

However, in a process in which the network device shares the COT with the terminal device, in some cases, there may be a time gap (to be specific, when the network device does not send data or a signal and the terminal device does not send data or a signal, another device such as a Wi-Fi device considers that a channel is in an idle state through channel listening). When the channel is in the idle state for more than a specific time, the channel may be preempted by another network device in an LBT manner. Therefore, the channel is occupied within the COT. Cases that may cause a time gap include but are not limited to the following several possible cases: A time gap may exist in a process from the terminal device receiving a scheduling instruction to the terminal device sending uplink data; or the network device schedules different terminal devices in different slots, and there is the time gap between terminal devices send data; or the network device schedules a specific terminal device to send uplink data, but the terminal device does not send the uplink data because the terminal device fails to detect scheduling information, which causes a time gap; and the like.

When the channel is occupied within the COT, to improve fairness of coexistence of different systems, the network device needs to use the original COT in the following LBT manner, or obtain a new COT.

In 3GPP research on LAA, there are four types of LBT operations:

Cat 1: CCA detection is not performed before data sending.

Cat 2: LBT mechanism without random backoff.

Cat 3: LBT mechanism with random backoff with a fixed size of contention window.

Cat 4: LBT mechanism with random backoff with a variable size of contention window.

In a manner, the network device continuously performs LBT of a short fixed length (LBT of a short fixed length is, for example, LBT Cat 2, and listening duration of LBT Cat 2 for one time is 25 μs) for S times, and can continue to use the original COT only when LBT of a short fixed length succeeds for S times. S is a positive integer greater than 1, and a specific value of S may be determined by a technical specification, or may be determined based on a remaining time length of the COT (for example, S is obtained by rounding up a value obtained by dividing the remaining time length of the COT by a unit time).

In another manner, the network device selects channel access priority parameters based on the remaining time length of the original COT, and the network device uses the selected channel access priority parameters to perform LBT Cat 4. If LBT Cat 4 succeeds, the original COT continues to be used. The channel access priority parameters include but are not limited to those shown in Table 1:

TABLE 1

Channel access priority parameters

| Channel access priority p | $m_p$ | $CW_{min, p}$ | $CW_{max, p}$ | $T_{ulmcot, p}$ |
|---|---|---|---|---|
| 1 | 2 | 3 | 7 | 2 ms |
| 2 | 2 | 7 | 15 | 3 ms |
| 3 | 3 | 15 | 1023 | 6 ms or 10 ms |
| 4 | 7 | 15 | 1023 | 6 ms or 10 ms | p represents a channel access priority, $m_p$ represents a channel access parameter 1 corresponding to a channel access priority p, $CW_{min, p}$ represents a minimum value of a channel access contention window parameter corresponding to the channel access priority p, $CW_{max,p}$ represents a maximum value of the channel access contention window parameter corresponding to the channel access priority p, and $T_{ulmcot,p}$ represents a length of a COT corresponding to the channel access priority p.

In still another manner, the network device may select a group of channel access priority parameters based on an agreement. For example, the network device selects a group of random contention window parameters corresponding to p=1 to perform LBT Cat 4. If LBT Cat 4 succeeds, the original COT continues to be used.

In yet another manner, the network device performs LBT with random backoff with a non-fixed length contention window (for example, execution parameters of LBT Cat 4 are used) to obtain a new COT. For example, the network device may select a group of channel access priority parameters based on a time length of a COT required for transmission to perform LBT Cat 4, to obtain a new COT. For example, when P=1 in table 1 is used, a time length of a newly obtained COT is 2 ms.

Figure 2:
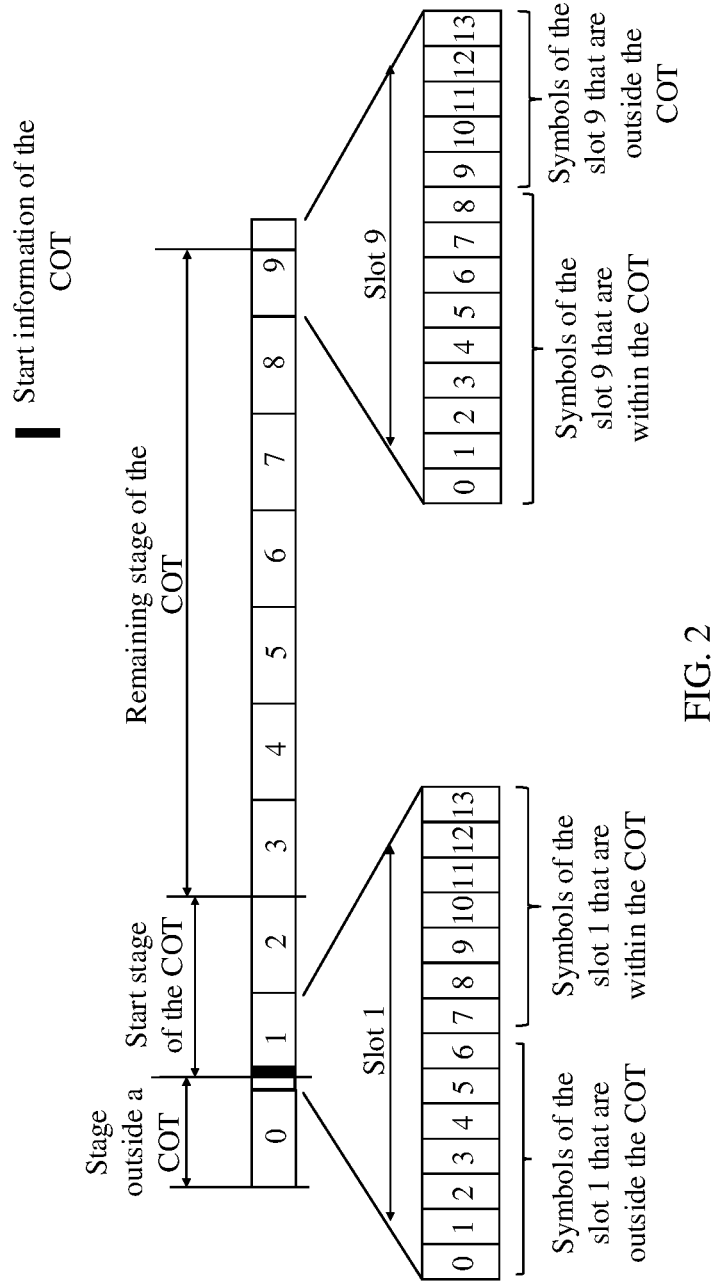
FIG. 2 is a schematic diagram of a frame format according to this application.

A COT includes a plurality of slots, a slot includes a plurality of symbols, and the COT is divided into three stages. As shown in FIG. 2, the three stages are respectively a stage outside the COT, a start stage of the COT, and a remaining stage of the COT.

The stage outside the COT is a stage before start information of the COT is sent, for example, as shown in FIG. 2, a stage before a symbol 7 (the symbol 7 is not included) of a slot 1.

The start stage of the COT starts from a moment at which the start information of the COT is sent to an end moment of consecutive R slots adjacent to a slot during which the start information of the COT is sent, where R is a positive integer. As shown in FIG. 2, if a value of R is 1, the start stage of the COT starts from the symbol 7 (the symbol 7 is included) of the slot 1 to an end moment of a slot 2.

The remaining stage of the COT is a stage from an end moment of the start stage of the COT to an end moment of the entire COT. As shown in FIG. 2, the remaining stage of the COT starts from the end moment of the slot 2 (which is also a start moment of a slot 3) to a symbol 8 (the symbol 8 is included) of a slot 9.

In the stage outside the COT, the terminal device may perform blind detection only on the start information of the COT. After the start information of the COT is detected through blind detection, it may be considered that the network device obtains the COT.

A start symbol of the COT obtained through LBT may be different from a start symbol of a slot, for example, the start symbol of the COT is the symbol 7 of the slot 1, but the start symbol of the slot 1 is a symbol o. Therefore, to improve utilization of spectrum resources, in a start stage of obtaining the COT, several symbols are usually used as a scheduling unit, for example, two symbols are used as a scheduling unit. Within a subsequent slot, a slot may be used as a scheduling unit. Therefore, different blind detection manners need to be configured within different time periods of the COT.

For example, in the stage outside the COT, blind detection is configured for only "the start information of the COT".

In the start stage of the COT, a second manner is configured to perform blind PDCCH detection, and detection opportunities (locations that need to be detected within a unit time) are relatively dense.

In the remaining stage of the COT, a first manner is configured to perform blind PDCCH detection, and detection opportunities are relatively sparse.

Within a unit time, location points at which the terminal device performs blind PDCCH detection in the second manner are more than location points at which the terminal device performs blind PDCCH detection in the first manner. The terminal device performs blind PDCCH detection in the second manner in the start stage of the COT, and performs blind PDCCH detection in the first manner in the remaining stage of the COT.

In this application, to enable the terminal device to switch to a suitable blind detection manner in time, so as to improve utilization of the spectrum resources and reduce power consumption of the terminal device, when a channel is not occupied within a first COT, the network device sends indication information to the terminal device within the first COT, where the indication information is used to indicate that the channel is not occupied within the first COT. When receiving the indication information, the terminal device may perform blind PDCCH detection in the first manner. When the channel is occupied within the first COT, the network device obtains a second COT within the first COT, and sends start information of the second COT to the terminal device. Correspondingly, if the terminal device does not receive the indication information, it indicates that the channel is occupied within the first COT, and the terminal device performs blind detection on the start information of the second COT.

In this application, the indication information used to indicate that the channel is not occupied within the first COT may also be a heartbeat signal. If the terminal device receives the heartbeat signal, it is considered that the channel is not occupied within the first COT. If the terminal device does not receive the heartbeat signal, it is considered that the channel is occupied within the first COT.

The following describes the technical solutions of this application by using several embodiments as examples, and same or similar concepts or processes may not be described in detail in some embodiments again.

Figure 3:
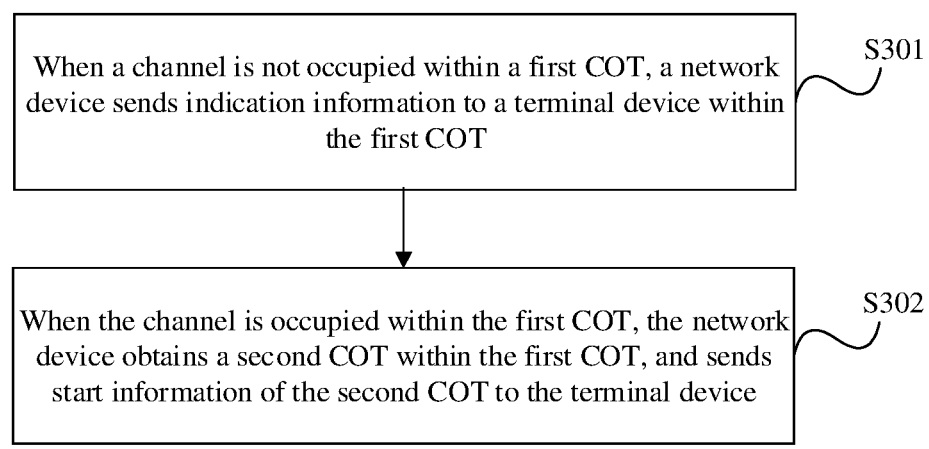
FIG. 3 is a schematic flowchart of a COT indication information sending method according to this application.

FIG. 3 is a schematic flowchart of a COT indication information sending method according to this application. As shown in FIG. 3, the method of this embodiment is as follows:

S301: When a channel is not occupied within a first COT, a network device sends indication information to a terminal device within the first COT.

The indication information is used to indicate that the channel is not occupied within the first COT.

S302: When the channel is occupied within the first COT, the network device obtains a second COT within the first COT, and sends start information of the second COT to the terminal device.

In a possible implementation, the network device may determine through carrier sensing whether the channel is occupied within the first COT. For example, if it is listened that signal energy on the channel is greater than a first preset threshold, it is considered that the channel is occupied. If it is listened that the signal energy on the channel is not greater than the first preset threshold, it is considered that the channel is not occupied.

In another possible implementation, within the first COT, the network device may determine, based on whether an uplink signal/uplink data sent by a scheduled terminal device is received, whether the channel is occupied within the first COT. If the uplink signal/uplink data is not received, it is considered that the channel is occupied. If the uplink signal/uplink data is received, it is considered that the channel is not occupied. Alternatively, whether the channel is occupied within the first COT is determined based on whether energy of the received uplink signal/uplink data sent by the scheduled terminal device is lower than a preset threshold. If the energy of the received uplink signal/uplink data is lower than or equal to the preset threshold, it is considered that the channel is occupied. If the energy of the received uplink signal/uplink data is higher than the preset threshold, it is considered that the channel is not occupied.

When the channel is not occupied within the first COT, the network device sends the indication information to the terminal device within the first COT. When the channel is occupied within the first COT, the network device obtains the second COT within the first COT, and sends the start information of the second COT to the terminal device. Correspondingly, the terminal device receives the indication information within the first COT. If the indication information is received, it is considered that the first COT is not occupied, and blind PDCCH detection is performed in a first manner. If the indication information is not received, it indicates that the first COT is occupied, and the start information of the second COT that is sent by the network device is received. Optionally, the start information of the second COT may be sent through a PDCCH, or may be sent independently of a PDCCH. When the start information of the second COT is sent through the PDCCH, if the indication information is not received, blind PDCCH detection is performed in a second manner. When the start information of the second COT is sent independently of the PDCCH, if the indication information is not received, blind detection is performed on the start information of the second COT, and if the start information of the second COT is received, blind PDCCH detection is performed in the second manner.

The indication information includes but is not limited to the following several possible implementations: a demodulation reference signal (Demodulation Reference Signal, DMRS), a DMRS and control information of a control channel carrying the DMRS, a preamble sequence, or another signal sequence (for example, an access sequence of Wi-Fi).

Manners in which the network device sends the indication information to the terminal device within the first COT include but are not limited to the following several possible implementations:

In a possible implementation, the network device sends the indication information within first N downlink symbols after uplink symbols and downlink symbols within the first COT are switched, where N is a positive integer. Optionally, a value of N may be 3. In this implementation, detection complexity of a UE can be simplified, and scheduling flexibility of the network device can be taken into consideration.

Figure 4:
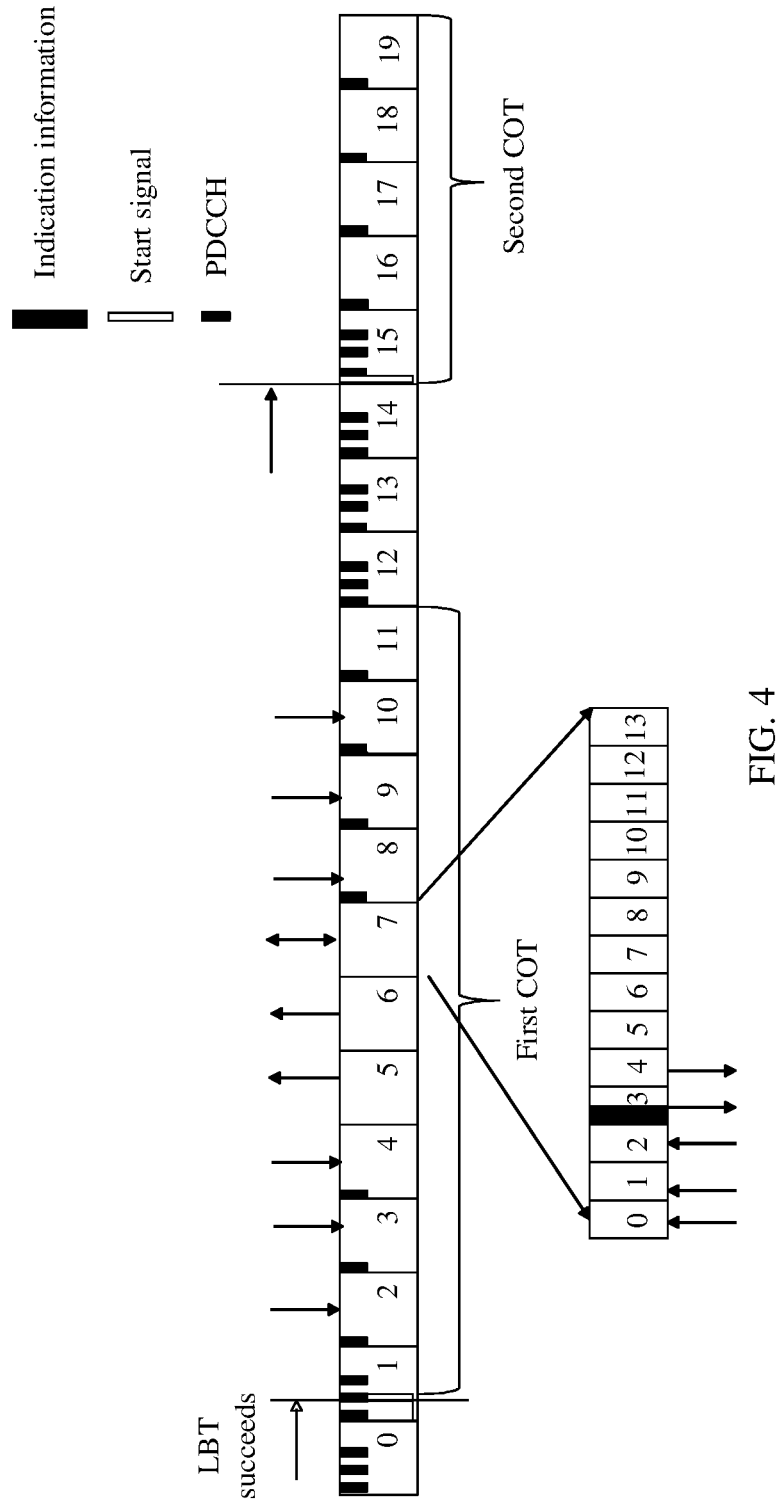
FIG. 4 is a schematic diagram of a frame format according to this application.

FIG. 4 is a schematic diagram of a frame format according to this application. A slot 1, a slot 2, a slot 3, and a slot 4 are downlink slots. A slot 5 and a slot 6 are uplink slots. A slot 7 is a mixed slot (in which a symbol o, a symbol 1, and a symbol 2 are uplink symbols, and a symbol 3 to a symbol 14 are downlink symbols). The symbol 3 of the slot 7 is the first downlink symbol after uplink symbols and downlink symbols are switched. Therefore, on the symbol 3 of the slot 7, if a channel is not occupied within a first COT, the network device sends the indication information to the terminal device. If the channel is occupied within the first COT, the network device does not send the indication information to the terminal device, obtains a second COT within the first COT, and sends start information of the second COT to the terminal device.

Correspondingly, the terminal device receives the indication information on the symbol 3 of the slot 7. If the indication information is received, it is considered that the channel is not occupied within the first COT, and the terminal device performs blind PDCCH detection in a first manner. If the terminal device does not receive the indication information, it is considered that the channel is not occupied within the first COT, and the terminal device receives the start information of the second COT. When the start information of the second COT is sent through a PDCCH, if the indication information is not received, blind PDCCH detection is performed in a second manner. Within a unit time, location points at which the terminal device performs blind PDCCH detection in the second manner are more than location points at which the terminal device performs blind PDCCH detection in the first manner. When the start information of the second COT is sent independently of the PDCCH, if the indication information is not received, blind detection is performed on the start information of the second COT. If the start information of the second COT is received, blind PDCCH detection is performed in the second manner within consecutive R slots including the start information.

In another possible implementation, the network device periodically sends the indication information on downlink symbols within the first COT, where a period length of the indication information is M downlink symbols, and M is a positive integer.

Figure 5A:
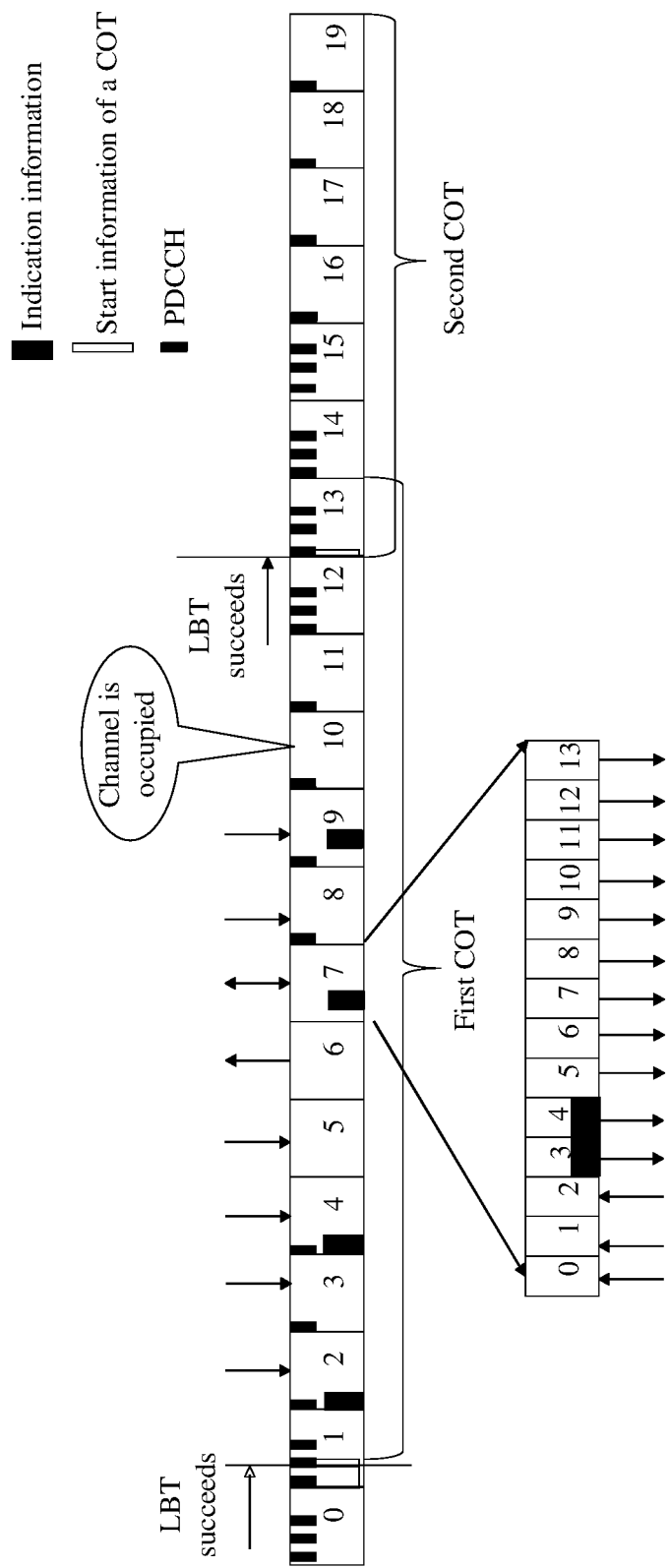
FIG. 5A is a schematic diagram of another frame format according to this application.

FIG. 5A is a schematic diagram of another frame format according to this application. A width of indication information is two symbols, and a period length of the indication information is 28 downlink symbols. A slot 1, a slot 2, a slot 3, a slot 4, and a slot 5 are downlink slots. A slot 6 is an uplink slot. A slot 7 is a mixed slot (in which a symbol o, a symbol 1, and a symbol 2 are uplink symbols, and a symbol 3 to a symbol 14 are downlink symbols). A slot 8 and a slot 9 are downlink slots. When a first COT is not occupied, the network device sends the indication information on a symbol 1 and a symbol 2 of the slot 2, sends the indication information on a symbol 1 and a symbol 2 of the slot 4, sends the indication information on the symbol 3 and a symbol 4 of the slot 7, and sends the indication information on a symbol 3 and a symbol 4 of the slot 9.

In still another possible implementation, the network device periodically sends the indication information on downlink symbols within the first COT, where the period length of the indication information is M symbols, and M is a positive integer.

Figure 5B:
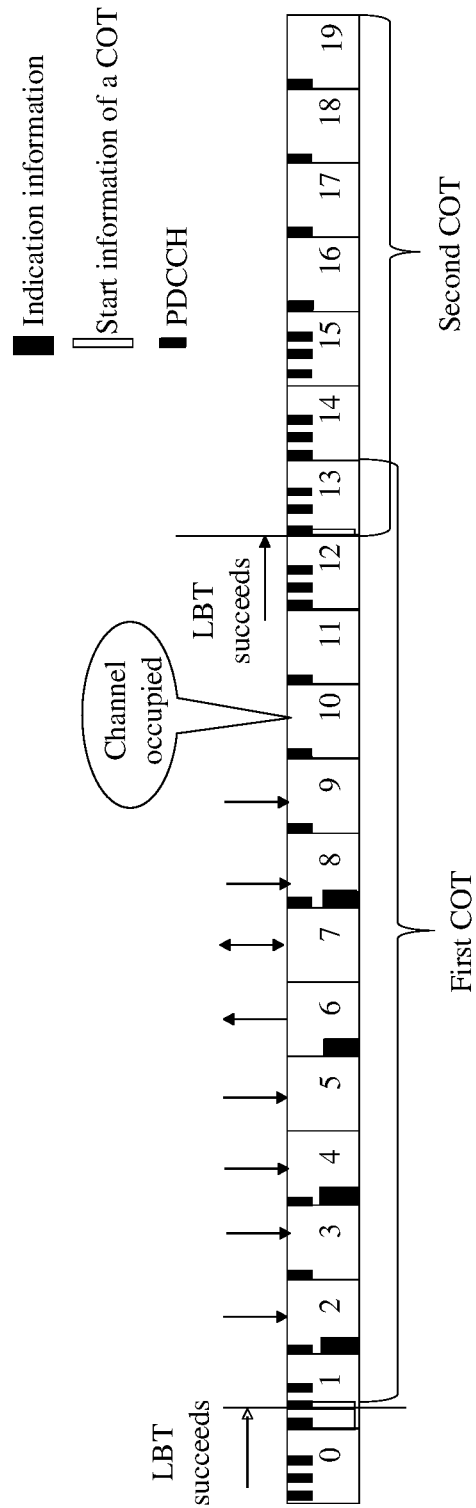
FIG. 5B is a schematic diagram of another frame format according to this application.

FIG. 5B is a schematic diagram of another frame format according to this application. A width of indication information is two symbols, and a period length of the indication information is 28 symbols. A slot 1, a slot 2, a slot 3, a slot 4, and a slot 5 are downlink slots. A slot 6 is an uplink slot. A slot 7 is a mixed slot (in which a symbol o, a symbol 1, and a symbol 2 are uplink symbols, and a symbol 3 to a symbol 14 are downlink symbols). A slot 8 and a slot 9 are downlink slots. When a first COT is not occupied, the network device sends the indication information on a symbol 1 and a symbol 2 of the slot 2, sends the indication information on a symbol 1 and a symbol 2 of the slot 4, and sends the indication information on a symbol 1 and a symbol 2 of the slot 8. Because the slot 6 is an uplink slot, the network device cannot send the indication information, and therefore skips sending the indication information.

In yet another possible implementation, the network device periodically sends the indication information on downlink symbols within the first COT, where the period length of the indication information is M slots, and M is a positive integer.

FIG. 5B is a schematic diagram of another frame format according to this application. A width of indication information is two symbols, and a period length of the indication information is two slots. A slot 1, a slot 2, a slot 3, a slot 4, and a slot 5 are downlink slots. A slot 6 is an uplink slot. A slot 7 is a mixed slot (in which a symbol o, a symbol 1, and a symbol 2 are uplink symbols, and a symbol 3 to a symbol 14 are downlink symbols). A slot 8 and a slot 9 are downlink slots. When a first COT is not occupied, the network device sends the indication information on a symbol 1 and a symbol 2 of the slot 2, sends the indication information on a symbol 1 and a symbol 2 of the slot 4, and sends the indication information on a symbol 1 and a symbol 2 of the slot 8. Because the slot 6 is an uplink slot, the network device cannot send the indication information, and therefore skips sending the indication information.

In yet another possible implementation, the network device sends the indication information to the terminal device within the first COT based on a bitmap.

Figures 6, 7:
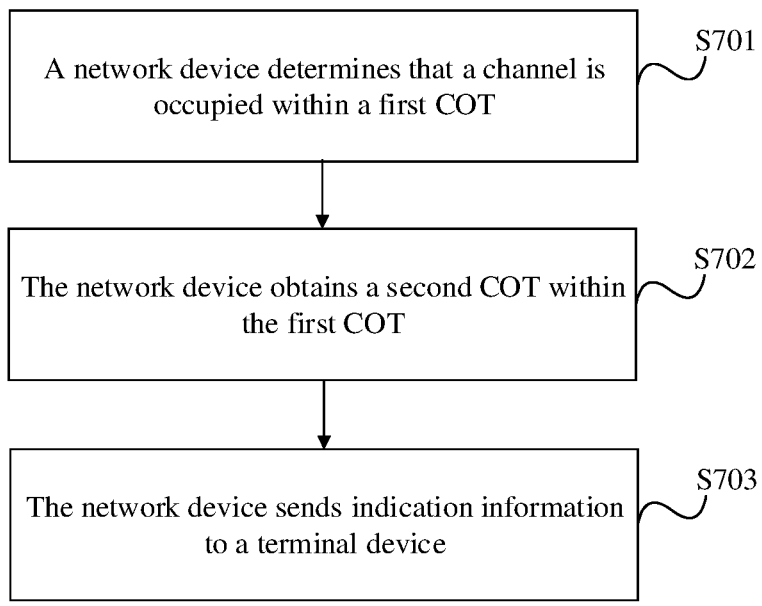
FIG. 6 is a schematic diagram of a bitmap according to this application.
FIG. 7 is a schematic flowchart of another COT indication information sending method according to this application.

FIG. 6 is a schematic diagram of a bitmap according to this application. When a bit value is o, it indicates that the indication information is not to be sent. When the bit value is 1, it indicates that the indication information is to be sent. In FIG. 6, a slot 2, a slot 6, and a slot 7 are slots for sending the indication information.

In yet another possible implementation, the network device sends the indication information to the terminal device within the first COT according to a preset rule.

For example, a remainder is obtained by a subframe number modulo 10, and it is determined to send the indication information to the terminal device on subframes whose remainders are 2, 6, and 7.

Optionally, the network device may send configuration information of a receiving time of the indication information to the terminal device in any manner including but not limited to: start information of a COT, a broadcast message, and a control message.

After a slot for sending the indication information is determined by using the foregoing method, a symbol location for sending the indication information is configured by using a higher layer signaling configuration method (for example, the indication information is limited to be sent on a symbol o, a symbol 1, or a symbol 2 of the slot).

Optionally, the network device performs LBT with random backoff with a non-fixed length contention window (for example, execution parameters of LBT Cat 4 are used) to obtain the second COT within the first COT.

In this embodiment, when the channel is not occupied within the first COT, the network device sends the indication information to the terminal device within the first COT, where the indication information is used to indicate that the channel is not occupied within the first COT. When the channel is occupied within the first COT, the network device obtains the second COT within the first COT, and sends start information of the second COT to the terminal device. Correspondingly, when receiving the indication information, the terminal device may perform blind PDCCH detection in a first manner. If the terminal device does not receive the indication information, it indicates that the channel is occupied within the first COT, and the terminal device performs blind detection on the start information of the second COT. According to the method provided in this embodiment of this application, the terminal device can learn of a channel occupancy condition in time, to perform blind detection in a suitable blind detection manner, thereby improving utilization of spectrum resources and reducing power consumption of the terminal device.

In the foregoing embodiment, start information of the first COT and indication information of the first COT may be distinguished in but not limited to a manner shown in table 2:

TABLE 2

Comparison table of representation manners of the start information of the first COT and the indication signal of the first COT

| | Start information of the first COT | Indication information of the first COT | Description |
|---|---|---|---|
| Distinguishing manner 1 | DMRS and control information of a control channel carrying the DMRS | DMRS denote | |
| Distinguishing manner 2 | First DMRS (which is scrambled by using a first scrambling code) and control information of a control channel carrying the first DMRS | Second DMRS (which is scrambled by using a second scrambling code) and control information of a control channel carrying the second DMRS | The first scrambling code is different from the second scrambling code. |
| Distinguishing manner 3 | DMRS and control information of a first control channel | DMRS and control information of a second control | The first radio network temporary identifier is different from the second |

TABLE 2-continued

Comparison table of representation manners of the start information of the first COT and the indication signal of the first COT

| | Start information of the first COT | Indication information of the first COT | Description |
|---|---|---|---|
| | carrying the DMRS (which is scrambled by using a first radio network temporary identifier) | channel carrying the DMRS (which is scrambled by using a second radio network temporary identifier) | radio network temporary identifier. |
| Distinguishing manner 4 | First information element of a control channel | Second information element of the control channel | The first information element is different from the second information element, for example, 0 represents the start information of the first COT, and 1 represents the indication information of the first COT. Alternatively, 1 represents the start information of the first COT, and 0 represents the indication information of the first COT. |

In the distinguishing manner 1, the start information of the first COT may be represented by the DMRS and the control information of the control channel carrying the DMRS; and the indication information of the first COT may be represented by the DMRS.

In the distinguishing manner 2, the start information of the first COT may be represented by the first DMRS and the control information of the control channel carrying the first DMRS, where the first DMRS is scrambled by using the first scrambling code; and the indication information of the first COT may be represented by the second DMRS and the control information of the control channel carrying the second DMRS, where the second DMRS is scrambled by using the second scrambling code, and the first scrambling code is different from the second scrambling code.

In the distinguishing manner 3, the start information of the first COT may be represented by the DMRS and the control information of the first control channel carrying the DMRS, where the control information of the first control channel carrying the DMRS is scrambled by using the first radio network temporary identifier; and the indication information of the first COT may be represented by the DMRS and the control information of the second control channel carrying the DMRS, where the control information of the second control channel carrying the DMRS is scrambled by using the second radio network temporary identifier, and the first radio network temporary identifier is different from the second radio network temporary identifier.

In the distinguishing manner 4, the start information of the first COT and the indication information of the first COT are represented by different control channel information elements, for example, o represents the start information of the first COT, and 1 represents the indication information of the first COT. Alternatively, 1 represents the start information of the first COT, and o represents the indication information of the first COT.

Optionally, start information and an indication signal of a same COT use same identification information, start information of two adjacent COTs uses different identification information, and indication signals of two adjacent COTs use different identification information (which may also be referred to as a bit information toggle determining method). As shown in table 3, it is assumed that 1-bit identification information is used to identify start information or indication information of a COT, a bit value of the identification information is A when the network device sends the start information of the first COT, and the bit value of the identification information is also A when the indication information of the first COT is subsequently sent; when the channel is occupied within the first COT, the second COT is obtained, the bit value of the identification information is B when the start information of the second COT is sent, and the bit value of the identification information is also B when indication information of the second COT is subsequently sent; when the channel is occupied within the second COT, a third COT is obtained, the bit value of the identification information is A when start information of the third COT is sent, and the bit value of the identification information is also A when indication information of the third COT is subsequently sent; and so on. In other words, whether the start information of the COT is start information of a new COT or the indication information of the original COT is determined based on whether the bit value of the identification information is changed. Correspondingly, the terminal device receives a change of the bit value of the identification information, if the bit value is A, it is considered that the start information of the first COT is received, and if the subsequently received bit value of the identification information is also A, it is considered that the indication information of the first COT is received. The terminal device receives a change of the bit value of the identification information, if the bit value is B, it is considered that the start information of the second COT is received, and if the subsequently received bit value of the identification information is also B, it is considered that the indication information of the second COT is received. The terminal device receives a change of the bit value of the identification information, if the bit value is A, it is considered that the start information of the third COT is received, and if the subsequently received bit value of the identification information is also B, it is considered that the indication information of the third COT is received.

TABLE 3

Representation manners of start information and indication information of a COT

| COT determining | Identification information |
|---|---|
| Start information of the first COT | A |
| Indication information of the first COT | A |
| Indication information of the first COT | A |
| Start information of the second COT | B |
| Indication information of the second COT | B |
| Indication information of the second COT | B |
| Indication information of the second COT | B |
| Start information of the third COT | A |
| Indication information of the third COT | A |
| Start information of a fourth COT | B |

FIG. 7 is a schematic flowchart of another COT indication information sending method according to this application. The method of this embodiment is as follows.

S701: A network device determines that a channel is occupied within a first COT.

S702: The network device obtains a second COT within the first COT.

For detailed descriptions of S701 and S702, refer to the foregoing embodiments, and details are not described herein again.

S703: The network device sends indication information to a terminal device.

The indication information is used to indicate transmission of the terminal device.

Optionally, the network device may send the indication information to the terminal device based on an end time of the second COT and an end time of the first COT. Correspondingly, the terminal device receives the indication information sent by the network device.

The following several nonrestrictive possible implementations are included:

In a possible implementation, when the end time of the second COT is later than the end time of the first COT, the indication information indicates the terminal device to continue transmission after the end time of the first COT, and correspondingly, the terminal device continues transmission after receiving the indication information.

Figure 8:
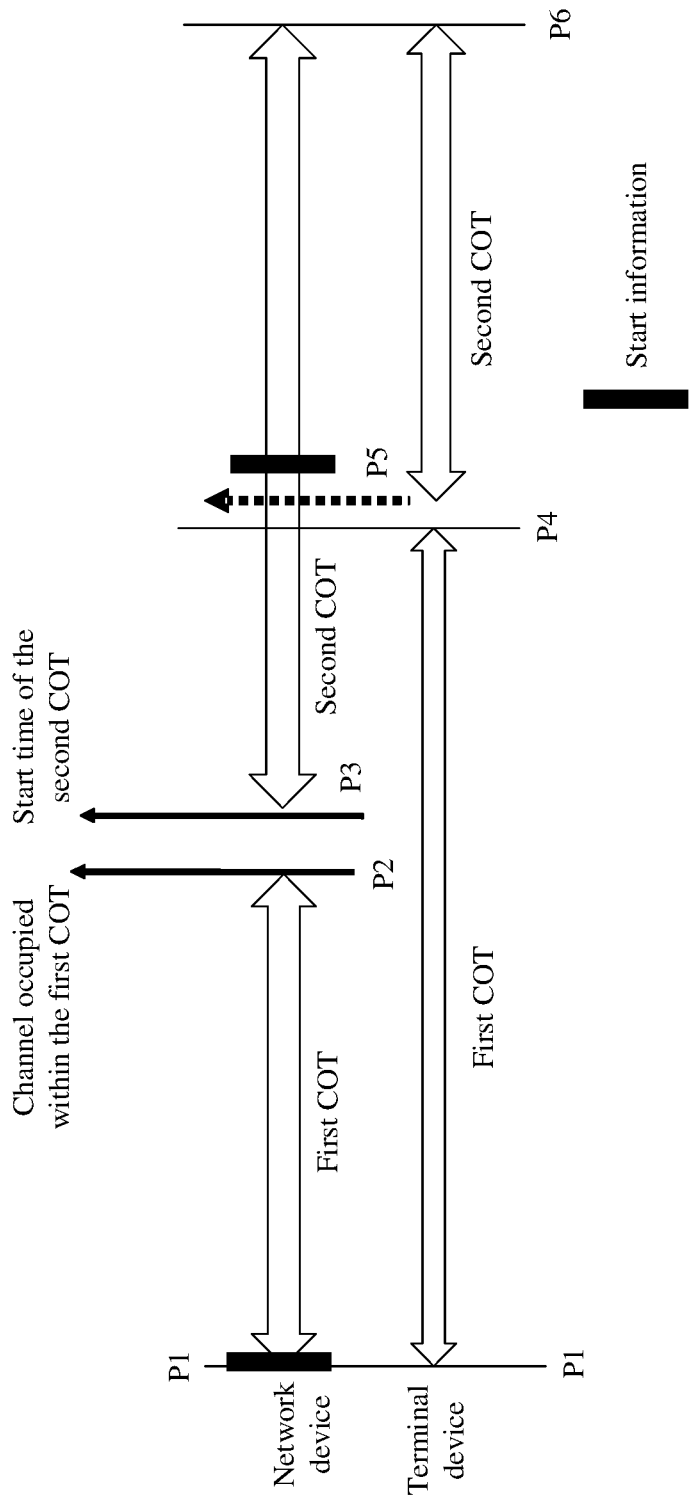
FIG. 8 is a schematic diagram of a scenario according to this application.

As shown in FIG. 8, the network device obtains the first COT at a point P1, a start time of the first COT is P1, and the end time of the first COT is P4. Because the channel is occupied at a point P2, the network device sends LBT and obtains the second COT at a point P3, a start time of the second COT is P3, and the end time of the second COT is P6. The network device sends the indication information to the terminal device, to indicate the terminal device to continue transmission after P4. Correspondingly, after receiving the indication information, the terminal device continues transmission after P4.

Optionally, a remaining time length of the second COT and frame format information corresponding to the remaining time length of the second COT may be further sent, and the terminal device continues transmission based on the remaining time length of the second COT and the frame format information corresponding to the remaining time length of the second COT.

In another possible implementation, when the end time of the second COT is earlier than or equal to the end time of the first COT, the indication information indicates the terminal device to end transmission at the end time of the second COT, and correspondingly, the terminal device ends transmission after receiving the indication information.

Figure 9:
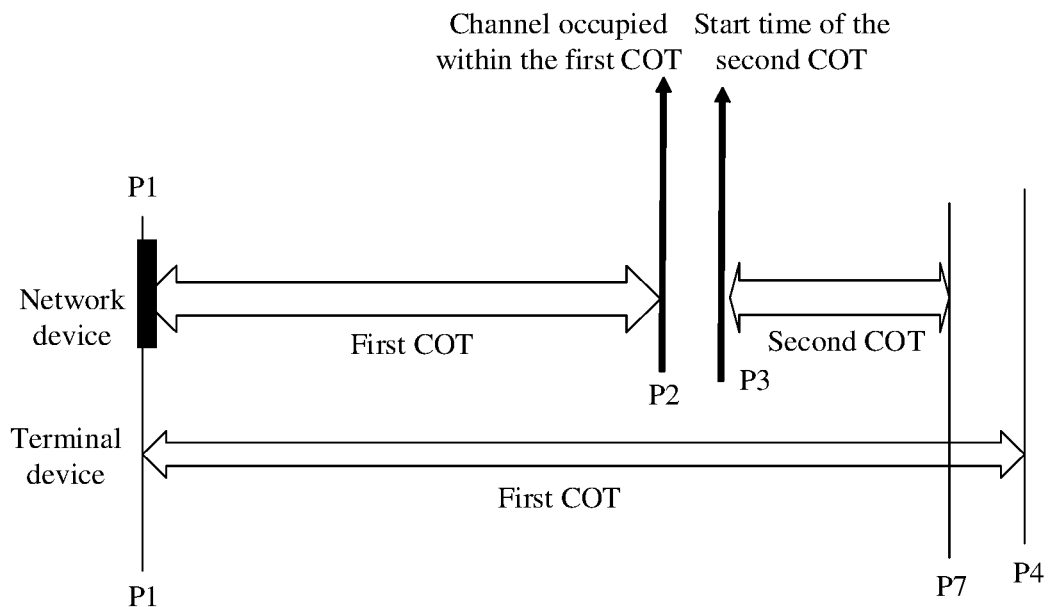
FIG. 9 is a schematic diagram of another scenario according to this application.

As shown in FIG. 9, the network device obtains the first COT at a point P1, the start time of the first COT is P1, and the end time of the first COT is P4. Because the channel is occupied at a point P2, the network device sends LBT and obtains the second COT at a point P3, the start time of the second COT is P3, and the end time of the second COT is P7. The network device sends the indication information to the terminal device, to indicate the terminal device to end transmission at P7. Correspondingly, the terminal device ends transmission at P7 after receiving the indication information.

Figure 10:
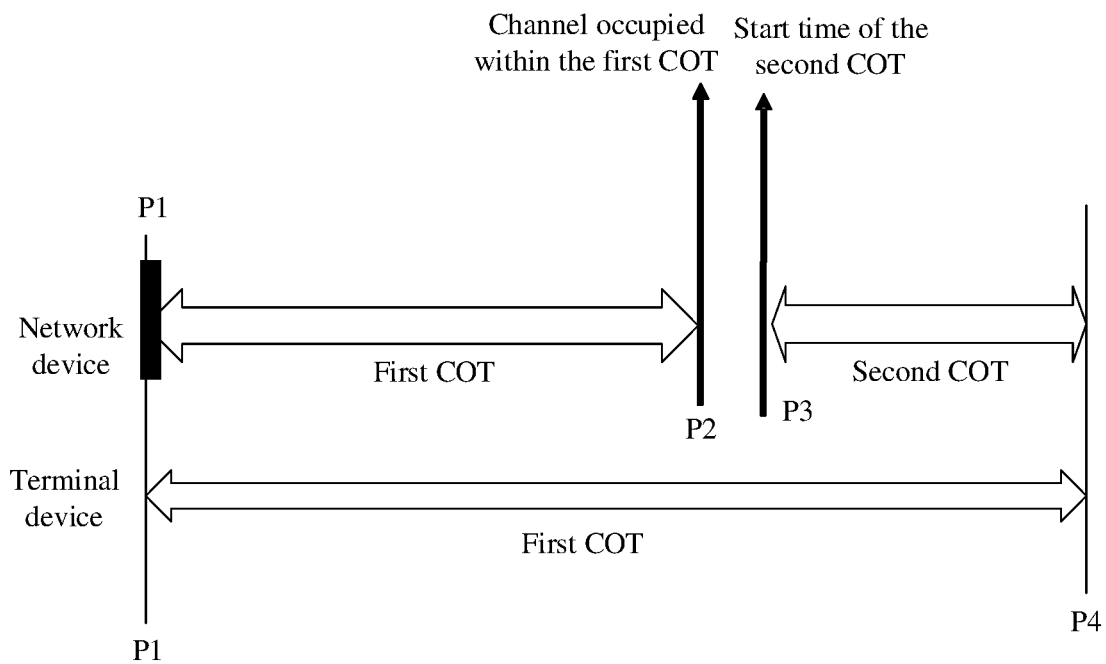
FIG. 10 is a schematic diagram of still another scenario according to this application.

Further, as shown in FIG. 10, the network device obtains the first COT at a point P1, the start time of the first COT is P1, and the end time of the first COT is P4. Because the channel is occupied at a point P2, the network device sends LBT and obtains the second COT at a point P3, the start time of the second COT is P3, and the end time of the second COT is P4. The network device sends the indication information to the terminal device, to indicate the terminal device to end transmission at P7. Correspondingly, the terminal device ends transmission at P4 after receiving the indication information.

Optionally, in the foregoing embodiment, when the end time of the second COT is earlier than the end time of the first COT, the network device may alternatively not send the indication information. For example, in FIG. 9, the network device may alternatively not send the indication information, and correspondingly, the terminal device ends transmission at the end time of the first COT.

Optionally, in the foregoing embodiment, when the end time of the second COT is equal to the end time of the first COT, the network device may not send the indication information. For example, in FIG. 10, the network device may alternatively not send the indication information, and correspondingly, the terminal device ends transmission at the end time of the first COT.

The indication information includes but is not limited to at least one of the following information: update information of the first COT, where the update information may include a remaining time length of the first COT, frame format information corresponding to the remaining time length, and the like; update information of the second COT, where the update information may include the remaining time length of the second COT, the frame format information corresponding to the remaining time length, and the like; the remaining time length of the second COT; the frame format information corresponding to the remaining time length of the second COT; and frame format information of the second COT.

In this embodiment, the network device determines that the channel is occupied within the first COT, obtains the second COT within the first COT, and sends the indication information to the terminal device, to indicate transmission of the terminal device. The terminal device does not need to detect whether the channel is occupied within the first COT, thereby reducing complexity of the terminal device.

Figure 11A:
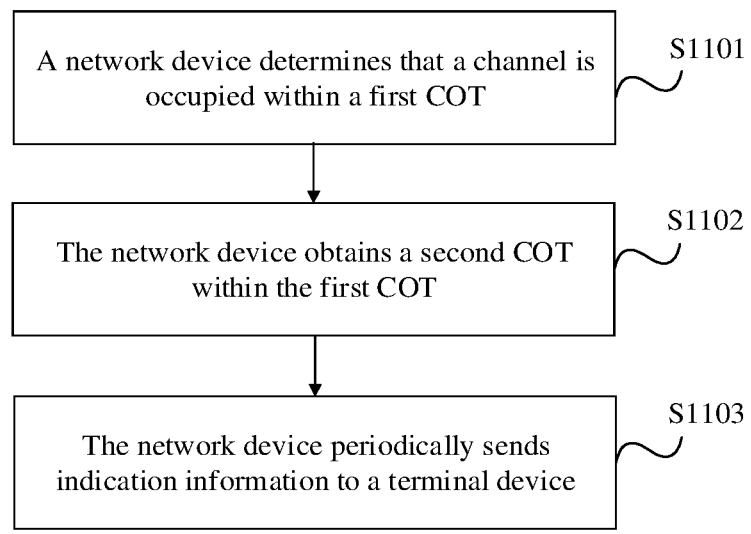
FIG. 11A is a schematic flowchart of still another COT indication information sending method according to this application.

FIG. 11A is a schematic flowchart of still another COT indication information sending method according to this application. The method of this embodiment is as follows.

S1101: A network device determines that a channel is occupied within a first COT.

S1102: The network device obtains a second COT within the first COT.

For detailed descriptions of S1101 and S1102, refer to the foregoing embodiments, and details are not described herein again.

S1103: The network device periodically sends indication information to a terminal device.

Correspondingly, the terminal device periodically receives the indication information and performs transmission based on the indication information.

The indication information includes but is not limited to at least one of the following information:
  update information of the first COT;
  update information of the second COT;
  a remaining time length of the second COT;
  frame format information corresponding to the remaining time length of the second COT;
  frame format information of the second COT; and
  bandwidth information of a transmission frequency domain of the second COT.

Figure 11B:
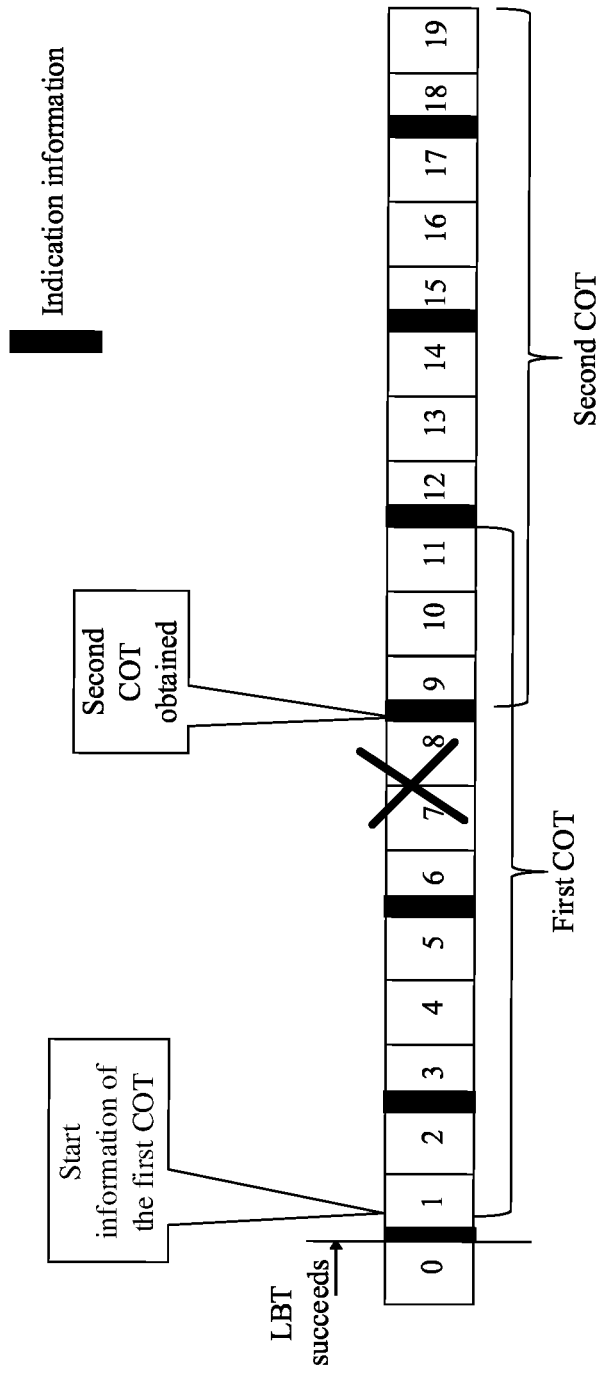
FIG. 11B is a schematic diagram of still another frame format according to this application.

As shown in FIG. 11B, it is assumed that the network device sends the indication information to the terminal device by using three slots as a period, and the indication information is sent to the terminal device in a slot 3, a slot 6, a slot 9, a slot 12, and the like. It is assumed that the indication information includes a remaining time length, the remaining time length of the indication information sent in the slot 3 is nine slots, and the remaining time length of the indication information sent in the slot 6 is six slots. The channel is occupied in a slot 7 within the first COT, the network device obtains the second COT in the slot 9, a time length of the second COT is 11 slots, the remaining time length of the indication information sent in the slot 9 is 11 slots, and the remaining time length of the indication information sent in a slot 12 is eight slots. Correspondingly, the terminal device periodically receives the indication information and performs transmission based on the indication information. For example, the terminal device receives the indication information, sent by the network device, in the slot 3, the slot 6, the slot 9, the slot 12, and the like.

In this embodiment, the network device determines that the channel is occupied within the first COT, obtains the second COT within the first COT, and periodically sends the indication information to the terminal device, to indicate transmission of the terminal device. The terminal device does not need to detect whether the channel is occupied within the first COT, thereby reducing complexity of the terminal device.

Optionally, in the foregoing embodiments, the terminal device determines a quantity of valid symbols of an end slot of a COT based on start information of the COT. Specifically, the terminal device determines a quantity of valid symbols of a start slot based on the start information of the COT, and determines the quantity of valid symbols of the end slot based on the quantity of valid symbols of the start slot and a quantity of symbols of a complete slot, where a sum of the quantity of valid symbols of the start slot and the quantity of valid symbols of the end slot is equal to the quantity of symbols of the complete slot.

For example, the terminal device determines a quantity of valid symbols of an end slot of the second COT based on start information of the second COT. Specifically, the terminal device determines a quantity of valid symbols of a start slot based on the start information of the second COT, determines the quantity of valid symbols of the end slot based on the quantity of valid symbols of the start slot and a quantity of symbols of a complete slot, where a sum of the quantity of valid symbols of the start slot and the quantity of valid symbols of the end slot is equal to the quantity of symbols of the complete slot.

In an LBT process, there is a non-complete slot. To simplify design and indication complexity, a time length of a COT is limited, for example, the time length of the COT includes an integer number of slots. In this case, if a start slot of the COT is a non-complete slot, an end slot of the COT is also a non-complete slot, and the time length of the COT may be calculated as: $N1+N2=N$, where N1 is a quantity of valid symbols included in the start slot of the COT, and N2 is a quantity of valid symbols included in the end slot of the COT. N is equal to a quantity of symbols included in one complete slot (for example, N=14). The quantity of valid symbols of the start slot of the COT may be determined based on start information of the COT and a timing relationship of a slot or a subframe (for example, the terminal device determines a start time of a subframe or a slot based on a synchronization signal block sent by a base station). The timing relationship is used to determine a location of a symbol for receiving the start information in the slot. The quantity of valid symbols of the end slot of the COT can be calculated in combination with $N1+N2=N$, where N is a determined symbol quantity. In this way, the terminal device and the network device can calculate a quantity of symbols of the start slot of the COT and a quantity of symbols of the end slot of the COT according to a same rule. Therefore, the time length of the COT or a quantity of valid symbols of slot format indication slot format information (SFI) can be calculated.

For example, the network device and the terminal device may determine the quantity of valid symbols of the start slot of the COT as 5 based on the start information of the COT and the timing relationship (for example, the terminal device determines the start time of the subframe or the slot based on the synchronization signal block sent by the base station), and may determine the quantity of valid symbols of the end slot of the COT as 9 based on $N1+N2=N$ (N=14).

Optionally, $N1+N2=N+delta$ (N is data configured by the network device, for example, N=14, and delta is a compensation amount of sending duration of a COT).

Optionally, the network device may further indicate the time length of the COT to the terminal device in the following manners:

In a possible implementation, the network device indicates the time length of the COT to the terminal device by sending the quantity of valid symbols of the start slot of the COT, a quantity of complete slots of the COT, and the quantity of valid symbols of the end slot of the COT; and the terminal device determines the time length of the COT based on the quantity of valid symbols of the start slot of the COT, the quantity of complete slots of the COT, and the quantity of valid symbols of the end slot of the COT.

In another possible implementation, the network device indicates the time length of the COT to the terminal device by sending a quantity of complete slots of the COT and the quantity of valid symbols of the end slot of the COT; and the terminal device determines the quantity of valid symbols of the start slot of the COT based on the start information of the COT and the timing relationship, and determines the time length of the COT in combination with the quantity of complete slots of the COT and the quantity of valid symbols of the end slot of the COT that are sent by the network device.

In still another possible implementation, the network device determines a quantity of complete slots of the COT based on the quantity of symbols of the end slot (for example, if the quantity of valid symbols of the end slot is greater than or equal to 7, it is considered that the end slot is a complete slot, and if the quantity of valid symbols of the end slot is less than 7, it is considered that the end slot is a non-complete slot), and sends the quantity of complete slots to the terminal device to indicate the time length of the COT. The terminal device determines the quantity of valid symbols of the start slot of the COT based on the start information of the COT and the timing relationship, and determines the time length of the COT in combination with the quantity of complete slots that is sent by the network device.

The foregoing manners may be used to determine a time length of the first COT, or may be used to determine a time length of the second COT.

When detecting the start information of the COT, the terminal device needs to perform automatic gain control (AGC) first. In this application, a DMRS and a PDCCH are designed in a time division multiplexing manner. The DMRS carries the start information of the COT. Therefore, demodulation performance of the PDCCH can be improved when the terminal device performs AGC.

Figure 12A:
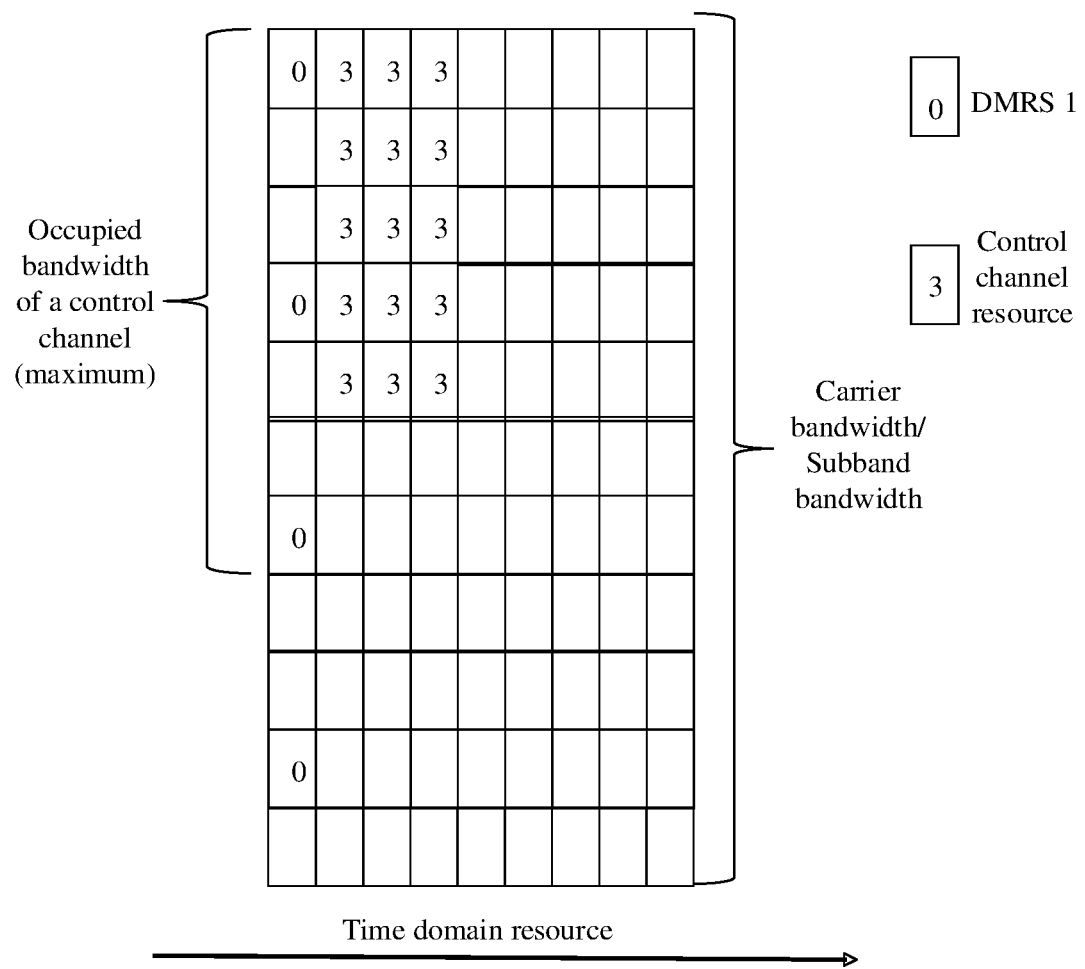
FIG. 12A is a schematic design diagram of a carrying signal of start information of a COT according to this application.
Figure 12B:
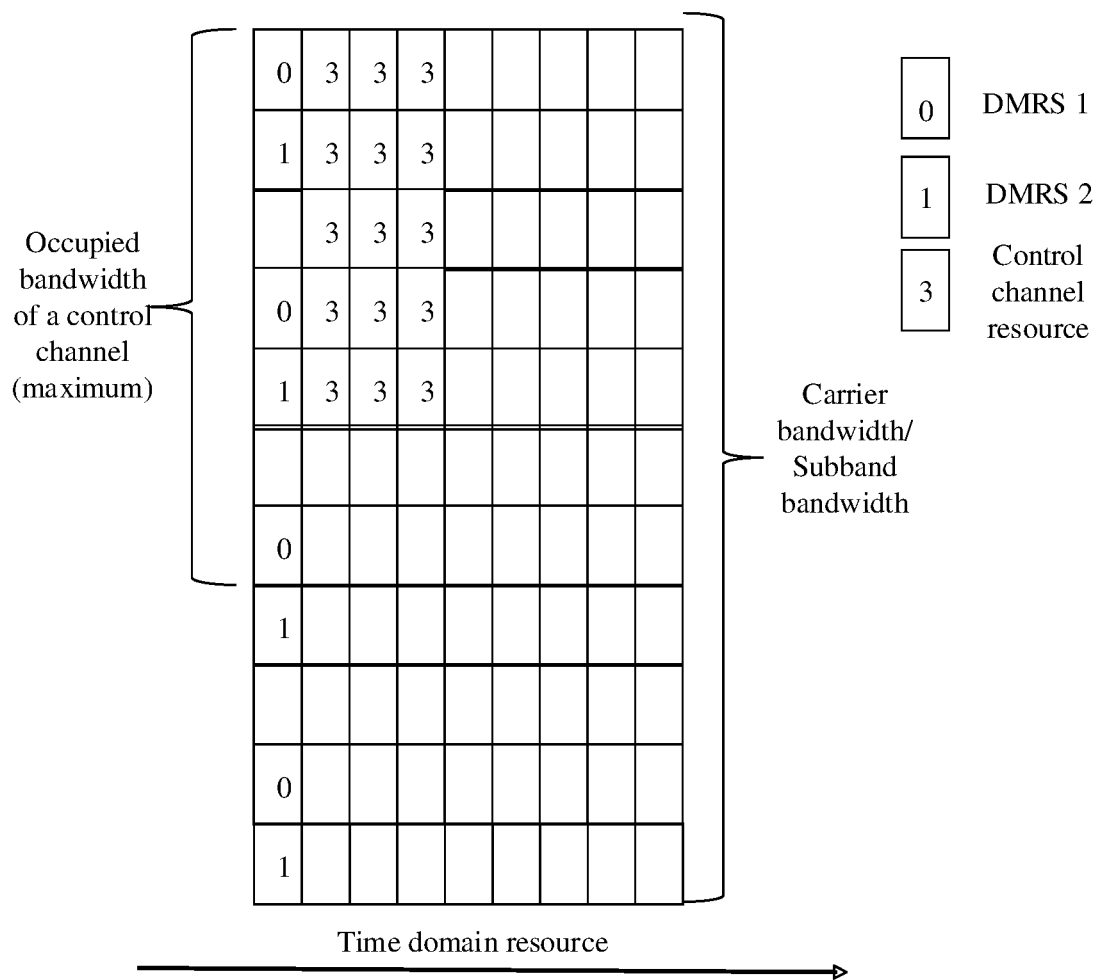
FIG. 12B is a schematic design diagram of another carrying signal of start information of a COT according to this application.

Optionally, a bandwidth of the DMRS is designed to be wider, for example, the bandwidth of the DMRS in the conventional technology is 10 MHz. In this application, as shown in FIG. 12A and FIG. 12B, for example, a system carrier bandwidth or a system subband bandwidth (for example, 20 MHz) can further improve the demodulation performance. In FIG. 12A, a resource element labeled 0 carries DMRS 1 (whose occupied bandwidth is 20 MHz, a carrier bandwidth, or a bandwidth unit for LBT), and an element labeled 3 carries control channel information (whose occupied bandwidth is a maximum control channel bandwidth set by a system). In FIG. 12B, a resource element labeled 0 carries DMRS 1 (whose occupied bandwidth is 20 MHz, a carrier bandwidth, or a bandwidth unit for LBT), and a resource element labeled 1 carries DMRS 2 (whose occupied bandwidth is 20 MHz, a carrier bandwidth, or a bandwidth unit for LBT, and DMRS 1 and DMRS 2 carry different COT information. An element labeled 3 carries control channel information (whose occupied bandwidth is a maximum control channel bandwidth set by the system).

Figure 13A:
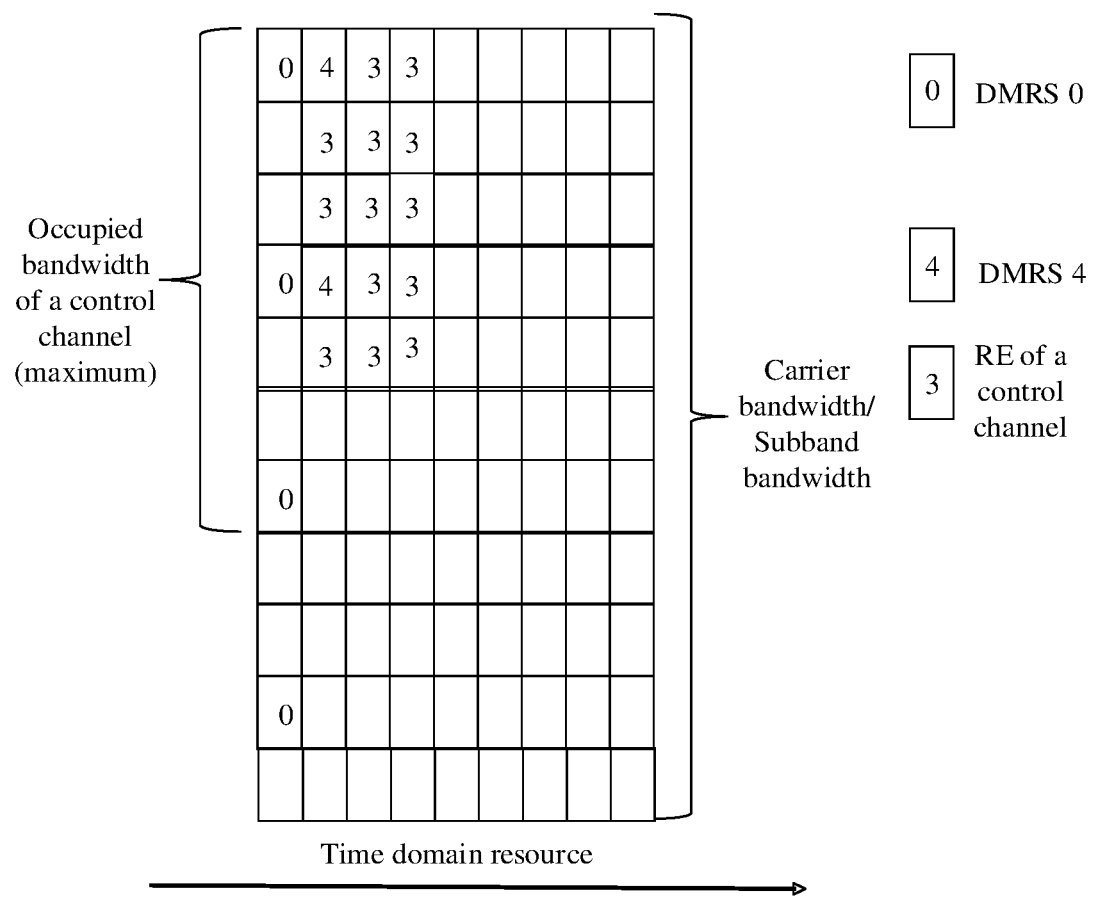
FIG. 13A is a schematic design diagram of still another carrying signal of start information of a COT according to this application.
Figure 13B:
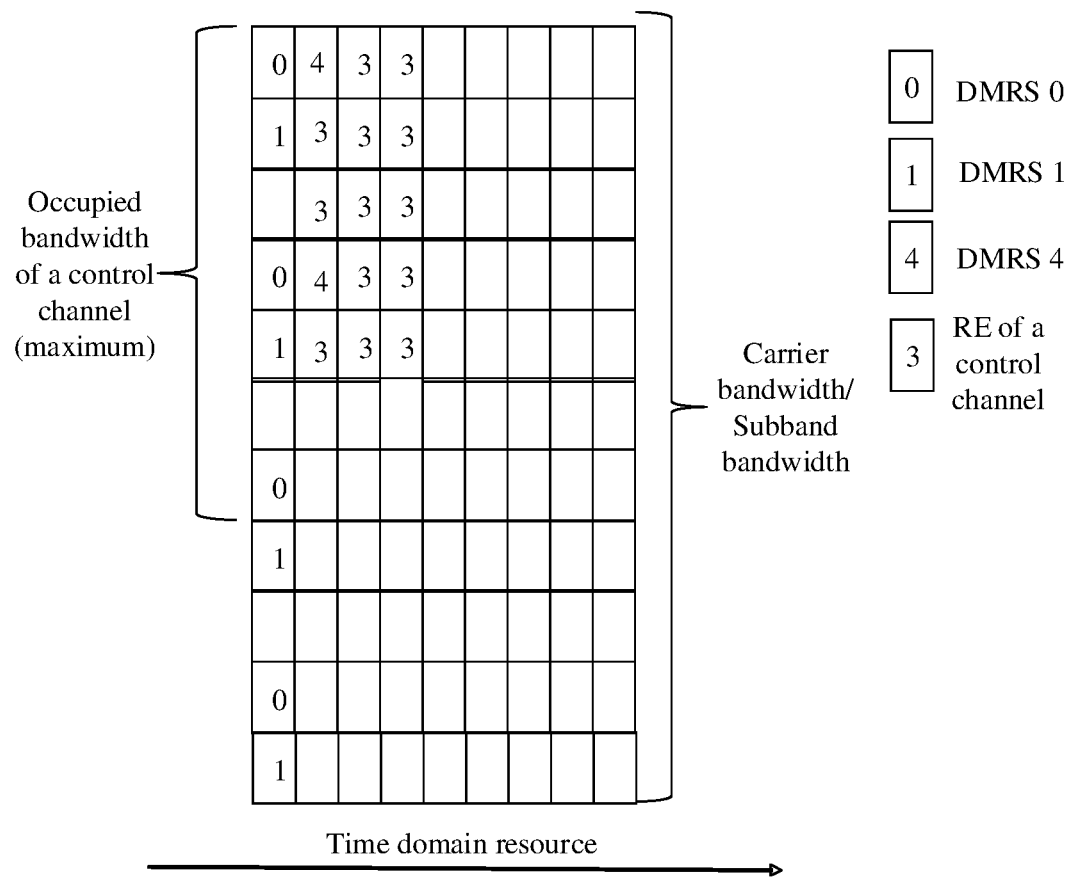
FIG. 13B is a schematic design diagram of yet another carrying signal of start information of a COT according to this application.

Optionally, a dedicated DMRS may alternatively be set on and carried by the PDCCH independently of the DMRS of the PDCCH, as shown in FIG. 13A and FIG. 13B. In FIG. 13A, a dedicated DMRS o is used by a UE to detect a start location (whose occupied bandwidth is a bandwidth unit for LBT, for example, 20 MHz) of a COT, and DMRS 4 is used to perform channel estimation on a control channel. In FIG. 13B, based on DMRS o, a dedicated DMRS 1 is added to carry start information of the COT, to further improve the demodulation performance.

Figure 14:
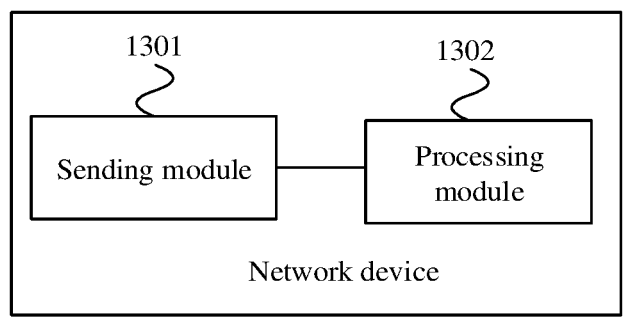
FIG. 14 is a schematic structural diagram of a communications apparatus according to this application.

FIG. 14 is a schematic structural diagram of a communications apparatus according to this application. The apparatus of this embodiment is deployed in a network device. The apparatus of this embodiment includes a sending module 1301 and a processing module 1302. The sending module 1301 is configured to: when a channel is not occupied within a first channel occupancy time COT, send indication information to a terminal device within the first COT, where the indication information is used to indicate that the channel is not occupied within the first COT. The processing module 1302 is configured to: when the channel is occupied within the first COT, obtain, by the network device, a second COT within the first COT. The sending module 1301 is further configured to send start information of the second COT to the terminal device.

Optionally, the sending module 1301 is specifically configured to send the indication information within first N downlink symbols after uplink symbols and downlink symbols within the first COT are switched, where N is a positive integer.

Optionally, the sending module 1301 is specifically configured to periodically send the indication information on downlink symbols within the first COT, where a period length of the indication information is M symbols, and M is a positive integer.

Optionally, the indication information includes any one of the following:

a demodulation reference signal DMRS;

a DMRS and control information of a control channel carrying the DMRS; or a preamble sequence.

The apparatus in this embodiment may be correspondingly configured to perform steps performed by the network device in the method embodiment shown in FIG. 3. The implementation principles and technical effects are similar, and are not further described herein.

Figure 15:
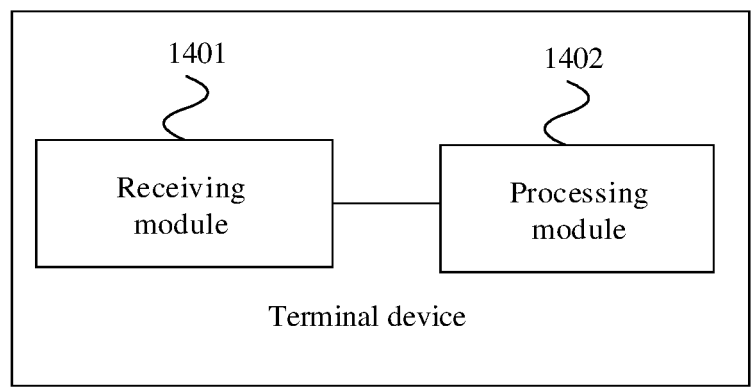
FIG. 15 is a schematic structural diagram of another communications apparatus according to this application.

FIG. 15 is a schematic structural diagram of another communications apparatus according to this application. The apparatus in this embodiment is deployed in a terminal device. The apparatus includes a receiving module 1401 and a processing module 1402. The receiving module 1401 is configured to receive indication information, where the indication information is used to indicate that a channel is not occupied within a first channel occupancy time COT. The processing module 1402 is configured to: when the terminal device does not receive the indication information, enable the receiving module 1401 to receive start information of a second COT that is sent by a network device.

Optionally, the receiving module 1401 is specifically configured to receive the indication information within first N downlink symbols after uplink symbols and downlink symbols within the first COT are switched, where N is a positive integer.

Optionally, the receiving module 1401 is specifically configured to periodically receive the indication information on downlink symbols within the first COT, where a period length of the indication information is M symbols, and M is a positive integer.

Optionally, the indication information includes any one of the following:

a demodulation reference signal DMRS;

a DMRS and control information of a control channel carrying the DMRS; or a preamble sequence.

Optionally, the receiving module 1401 is further configured to perform blind physical downlink control channel PDCCH detection in a first manner when receiving the indication information.

The processing module 1402 is further configured to: when the receiving module 1401 does not receive the indication information, enable the receiving module 1401 to perform blind PDCCH detection in a second manner, where within a unit time, location points at which the receiving module performs blind PDCCH detection in the second manner are more than location points at which the receiving module performs blind PDCCH detection in the first manner.

The apparatus in this embodiment may be correspondingly configured to perform steps performed by the terminal device in the method embodiment shown in FIG. 3. The implementation principles and technical effects are similar, and are not further described herein.

Figure 16:
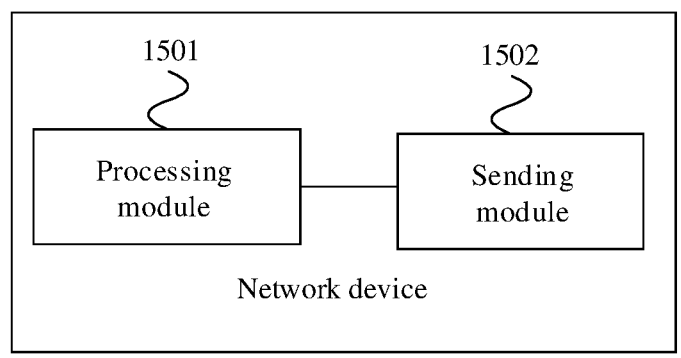
FIG. 16 is a schematic structural diagram of still another communications apparatus according to this application.

FIG. 16 is a schematic structural diagram of still another communications apparatus according to this application. The apparatus of this embodiment is deployed in a network device. The apparatus of this embodiment includes a processing module 1501 and a sending module 1502.

The processing module 1501 is configured to determine that a channel is occupied within a first channel occupancy time COT.

The processing module 1501 is further configured to obtain a second COT within the first COT.

The sending module 1502 is configured to send indication information to a terminal device, where the indication information is used to indicate transmission of the terminal device.

Optionally, the processing module 1501 is specifically configured to enable the sending module 1502 to send the indication information based on an end time of the second COT and an end time of the first COT.

Optionally, when the end time of the second COT is earlier than or equal to the end time of the first COT, the indication information indicates the terminal device to end transmission at the end time of the second COT; or when the end time of the second COT is later than the end time of the first COT, the indication information indicates the terminal device to continue transmission after the end time of the first COT.

Optionally, the indication information further includes at least one of the following:
update information of the first COT;
update information of the second COT;
a remaining time length of the second COT;
frame format information corresponding to the remaining time length of the second COT; and
frame format information of the second COT.

The apparatus in this embodiment may be correspondingly configured to perform steps performed by the network device in the method embodiment shown in FIG. 7. The implementation principles and technical effects are similar, and are not further described herein.

Optionally, in the foregoing embodiment, the sending module 1502 is specifically configured to periodically send the indication information to the terminal device.

The apparatus in this embodiment may be correspondingly configured to perform steps performed by the network device in the method embodiment shown in FIG. 2. The implementation principles and technical effects are similar, and are not further described herein.

Optionally, the processing module 1501 is further configured to: determine a quantity of symbols of an end slot of the first COT based on start information of the first COT; or determine a quantity of valid symbols of an end slot of the second COT based on start information of the second COT.

Figure 17:
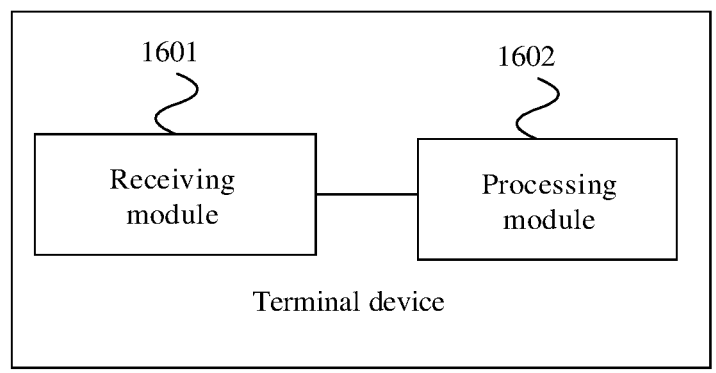
FIG. 17 is a schematic structural diagram of yet another communications apparatus according to this application.

FIG. 17 is a schematic structural diagram of yet another communications apparatus according to this application. The apparatus is deployed in a terminal device. The apparatus includes a receiving module 1601 and a processing module 1602.

The receiving module 1601 is configured to receive indication information sent by a network device, where the indication information is used to indicate transmission of the terminal device.

Optionally, when an end time of the second COT is earlier than or equal to an end time of the first COT, the indication information indicates the terminal device to end transmission at the end time of the second COT; or when the end time of the second COT is later than the end time of the first COT, the indication information indicates the terminal device to continue transmission after the end time of the first COT.

Optionally, the indication information further includes at least one of the following:
update information of the first COT;
update information of the second COT;
a remaining time length of the second COT;
frame format information corresponding to the remaining time length of the second COT; and
frame format information of the second COT.

The apparatus in this embodiment may be correspondingly configured to perform steps performed by the terminal device in the method embodiment shown in FIG. 7. The implementation principles and technical effects are similar, and are not further described herein.

Optionally, the receiving module 1601 is specifically configured to periodically receive the indication information sent by the network device.

The apparatus in this embodiment may be correspondingly configured to perform steps performed by the terminal device in the method embodiment shown in FIG. 2. The implementation principles and technical effects are similar, and are not further described herein.

Optionally, the apparatus further includes: a processing module 1602, configured to determine a quantity of valid symbols of an end slot of the second COT based on start information of the second COT.

Optionally, the processing module 1602 is specifically configured to: determine a quantity of valid symbols of a start slot of the second COT based on the start information of the second COT, and determine the quantity of valid symbols of the end slot based on the quantity of valid symbols of the start slot and a quantity of symbols of a complete slot, where a sum of the quantity of valid symbols of the start slot and the quantity of valid symbols of the end slot is equal to the quantity of symbols of the complete slot.

Figure 18:
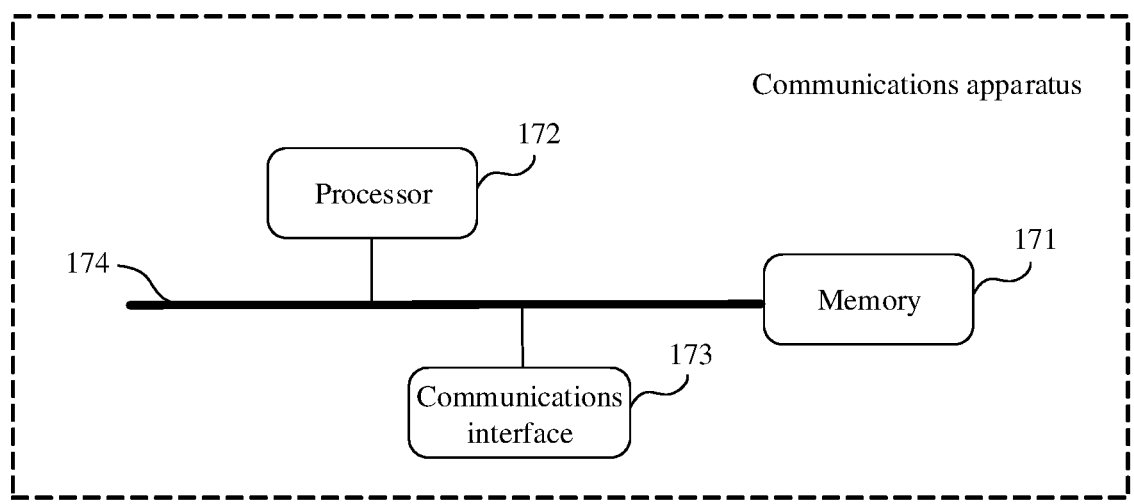
FIG. 18 is a schematic diagram of a hardware structure of a communications apparatus according to this application.

FIG. 18 is a schematic diagram of a hardware structure of a communications apparatus according to this application. Referring to FIG. 18, the communications apparatus 17 includes a memory 171, a processor 172, and a communications interface 173, where the memory 171, the processor 172, and the communications interface 173 may communicate with each other. For example, the memory 171, the processor 172, and the communications interface 173 may communicate with each other by using a communications bus 174. The memory 171 is configured to store a computer program. The processor 172 executes the computer program to implement the method shown in the embodiment shown in FIG. 3, FIG. 7, or FIG. 11A.

Optionally, the communications interface 173 may further include a transmitter and/or a receiver.

Optionally, the processor may be a central processing unit (CPU), or may be another general purpose processor, a digital signal processor (DSP), an application-specific integrated circuit (ASIC), or the like. The general purpose processor may be a microprocessor, or the processor may be any conventional processor or the like. The steps of the methods disclosed with reference to this application may be directly implemented by a hardware processor, or may be implemented by a combination of hardware and a software module in a processor.

This application provides a storage medium. The storage medium is configured to store a computer program. The computer program is used to implement the method shown in the embodiment shown in FIG. 3, FIG. 7, or FIG. 11A.

This application further provides a communications system, including the communications apparatus shown in FIG. 14 and the communications apparatus shown in FIG. 16.

This application further provides a communications system, including the communications apparatus shown in FIG. 15 and the communications apparatus shown in FIG. 17.

This application provides a system chip. The system chip is configured to support a communications apparatus to implement a function shown in the embodiments of this application (for example, when a channel is not occupied within a first channel occupancy time COT, a network device sends indication information to a terminal device within the first COT, where the indication information is used to indicate that the channel is not occupied within the first COT; and when the channel is occupied within the first COT, the network device obtains a second COT within the first COT, and sends start information of the second COT to the terminal device). The chip is specifically used in a chip system. The chip system may include a chip, or may include a chip and another discrete device. When the foregoing method is implemented by using a chip in a first device, the chip includes a processing unit. Further, the chip may further include a communications unit. The processing unit may be, for example, a processor. When the chip includes the communications unit, the communications unit may be, for example, an input/output interface, a pin, or a circuit. The processing unit performs all or some actions performed by processing modules in the embodiments of this application, and the communications unit may perform a corresponding receiving or sending action, for example, the communications unit may receive configuration signaling sent by the network device. In another specific embodiment, in this application, a processing module of a receiving device may be the processing unit of the chip, and a receiving module or a sending module of a control device may be the communications unit of the chip.

The embodiments of this application are described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general purpose computer, a dedicated computer, an embedded processor, or a processor of any other programmable data processing unit to generate a machine, so that the instructions executed by a computer or a processor of any other programmable data processing unit generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

What is claimed is:

1. A method, comprising:
   in response to determining that a channel is not occupied within a first channel occupancy time (COT), sending, by a network device, indication information to a terminal device within the first COT, wherein the indication information indicates that the channel is not occupied within the first COT, the indication information comprises an identifier identifying the first COT, and the indication information is scrambled using a first scrambling code associated with indication information of one or more COTs; and
   in response to determining that the channel is occupied within the first COT, obtaining, by the network device, a second COT within the first COT, and sending start information of the second COT to the terminal device, wherein the start information of the second COT carries an identifier identifying the second COT, and the start information of the second COT is scrambled using a second scrambling code associated with start information of one or more COTs, and wherein the indication information is determined to be indication information based on the first scrambling code being used to scramble the indication information, and the start information of the second COT is determined to be start information based on the second scrambling code being used to scramble the start information of the second COT.

2. The method according to claim 1, wherein sending, by the network device, the indication information to the terminal device within the first COT comprises:
   sending, by the network device, the indication information within first N downlink symbols after uplink symbols and downlink symbols within the first COT are switched, wherein N is a positive integer.

3. The method according to claim 1, wherein sending, by the network device, the indication information to the terminal device within the first COT comprises:
   periodically sending, by the network device, the indication information on downlink symbols within the first COT, wherein a period length of sending the indication information is M symbols, and M is a positive integer.

4. The method according to claim 1, wherein the indication information comprises:
   a demodulation reference signal (DMRS) and control information of a control channel carrying the DMRS.

5. The method according to claim 1, further comprising:
   sending, by the network device, start information of the first COT.

6. A method, comprising:
   in response to receiving, by a terminal device, indication information, determining that a channel is not occupied within a first channel occupancy time (COT), wherein the indication information indicates that the channel is not occupied within the first COT, wherein the indication information comprises an identifier identifying the first COT, and the indication information is scrambled using a first scrambling code associated with indication information of one or more COTs; and in response to the terminal device not receiving the indication information before receiving start information of a second COT that is sent by a network device, determining, by the terminal device, to perform blind detection using the start information of the second COT, and wherein the start information of the second COT carries an identifier identifying the second COT, and the start information of the second COT is scrambled using a second scrambling code associated with start information of one or more COTs, and wherein the indication information is determined to be indication information based on the first scrambling code being used to scramble the indication information, and the start information of the second COT is determined to be start information based on the second scrambling code being used to scramble the start information of the second COT.

7. The method according to claim 6, wherein receiving, by the terminal device, the indication information comprises:
receiving, by the terminal device, the indication information within first N downlink symbols after uplink symbols and downlink symbols within the first COT are switched, wherein N is a positive integer.

8. The method according to claim 6, wherein receiving, by the terminal device, the indication information comprises:
periodically receiving, by the terminal device, the indication information on downlink symbols within the first COT, wherein a period length of receiving the indication information is M symbols, and M is a positive integer.

9. The method according to claim 6, wherein the indication information comprises:
a demodulation reference signal (DMRS) and control information of a control channel carrying the DMRS.

10. The method according to claim 6, wherein:
when the terminal device receives the indication information, the terminal device performs blind physical downlink control channel (PDCCH) detection in a first manner; and
when the terminal device does not receive the indication information, the terminal device performs blind PDCCH detection in a second manner; and
wherein within a unit time, location points at which the terminal device performs blind PDCCH detection in the second manner are more than location points at which the terminal device performs blind PDCCH detection in the first manner.

11. The method according to claim 6, further comprising:
receiving, by the terminal device, start information of the first COT.

12. An apparatus, comprising:
one or more processors; and
a non-transitory memory, configured to store instructions; and
wherein the one or more processors are configured to execute the instructions stored in the memory, causing the apparatus to perform the following:
in response to determining that a channel is not occupied within a first channel occupancy time (COT), send indication information to a terminal device within the first COT, wherein the indication information indicates that the channel is not occupied within the first COT, the indication information comprises an identifier identifying the first COT, and the indication information is scrambled using a first scrambling code associated with indication information of one or more COTs; and in response to determining that the channel is occupied within the first COT, obtain a second COT within the first COT, and send start information of the second COT to the terminal device, wherein the start information of the second COT carries an identifier identifying the second COT, and the start information of the second COT is scrambled using a second scrambling code associated with start information of one or more COTs, and wherein the indication information is determinable to be indication information based on the first scrambling code being used to scramble the indication information, and the start information of the second COT is determinable to be start information based on the second scrambling code being used to scramble the start information of the second COT.

13. The apparatus according to claim 12, wherein sending the indication information to the terminal device within the first COT comprises:
sending the indication information within first N downlink symbols after uplink symbols and downlink symbols within the first COT are switched, wherein N is a positive integer.

14. The apparatus according to claim 12, wherein sending the indication information to the terminal device within the first COT comprises:
periodically sending the indication information on downlink symbols within the first COT, wherein a period length of sending the indication information is M symbols, and M is a positive integer.

15. The apparatus according to claim 12, wherein the indication information comprises:
a demodulation reference signal (DMRS) and control information of a control channel carrying the DMRS.

16. The apparatus according to claim 12, wherein the one or more processors are configured to execute the instructions stored in the memory, further causing the apparatus to perform the following:
sending start information of the first COT.

17. An apparatus, comprising:
one or more processors; and
a non-transitory memory, configured to store instructions; and
wherein the one or more processors are configured to execute the instructions stored in the non-transitory memory, causing the apparatus to perform the following:
in response to receiving indication information, determining that a channel is not occupied within a first channel occupancy time (COT), and performing blind physical downlink control channel (PDCCH) detection in a first manner, wherein the indication information indicates that the channel is not occupied within the first channel occupancy time (COT), wherein the indication information comprises an identifier identifying the first COT, and the indication information is scrambled using a first scrambling code associated with indication information of one or more COTs; and
in response to not receiving the indication information when the apparatus receives start information of a second COT that is sent by a network device, determining to perform blind detection using the start information of the second COT, and performing blind PDCCH detection in a second manner, and wherein the start information of the second COT carries an identifier identifying the second COT, and the start information of the second COT is scrambled using a second scrambling code associated with start information of one or more COTs, and wherein the indication information is determined to be indication information based on the first scrambling code being used to scramble the indication information, and the start information of the second COT is determined to be start information based on the second scrambling code being used to scramble the start information of the second COT; and wherein within a unit time, location points at which the apparatus performs blind PDCCH detection in the second manner are more than location points at which the apparatus performs blind PDCCH detection in the first manner.

18. The apparatus according to claim 17, wherein receiving the indication information comprises:

receiving the indication information within first N downlink symbols after uplink symbols and downlink symbols within the first COT are switched, wherein N is a positive integer.

19. The apparatus according to claim 17, wherein receiving the indication information comprises:

periodically receiving the indication information on downlink symbols within the first COT, wherein a period length of the indication information is M symbols, and M is a positive integer.

20. The apparatus according to claim 17, wherein the indication information comprises:

a demodulation reference signal (DMRS) and control information of a control channel carrying the DMRS.

* * * * *